(12) United States Patent
Tononishi et al.

(10) Patent No.: US 9,590,264 B2
(45) Date of Patent: Mar. 7, 2017

(54) ELECTRIC STORAGE DEVICE

(71) Applicants: GS Yuasa International Ltd., Kyoto-shi (JP); HONDA MOTOR CO., LTD., Tokyo (JP)

(72) Inventors: Masamitsu Tononishi, Kyoto-shi (JP); Satoshi Murakami, Kyoto-shi (JP); Tomonori Kishimoto, Kyoto-shi (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 263 days.

(21) Appl. No.: 14/378,085

(22) PCT Filed: Jan. 18, 2013

(86) PCT No.: PCT/JP2013/050943
§ 371 (c)(1),
(2) Date: Aug. 11, 2014

(87) PCT Pub. No.: WO2013/125271
PCT Pub. Date: Aug. 29, 2013

(65) Prior Publication Data
US 2015/0024264 A1    Jan. 22, 2015

(30) Foreign Application Priority Data

Feb. 22, 2012   (JP) ................................ 2012-035913

(51) Int. Cl.
*H01M 4/64* (2006.01)
*H01M 10/04* (2006.01)
(Continued)

(52) U.S. Cl.
CPC ........ *H01M 10/0413* (2013.01); *H01G 11/38* (2013.01); *H01G 11/68* (2013.01);
(Continued)

(58) Field of Classification Search
CPC ...................................................... H01M 4/64
See application file for complete search history.

(56) References Cited

U.S. PATENT DOCUMENTS

2004/0028999 A1   2/2004 Richard et al.
2005/0287429 A1   12/2005 Cho et al.
(Continued)

FOREIGN PATENT DOCUMENTS

| JP | 2004-273178 A | 9/2004 |
| JP | 2005-216825 A | 8/2005 |

(Continued)

OTHER PUBLICATIONS

English Translation of International Preliminary Report on Patentability in PCT No. PCT/JP2013/050943 dated Sep. 4, 2014.

*Primary Examiner* — Jacob Marks
(74) *Attorney, Agent, or Firm* — McGinn IP Law Group, PLLC.

(57) ABSTRACT

Provided is an electric storage device capable of suitably preventing damage to end portions of an electrode assembly due to vibration. A current collector and a backing member are cooperated and connected to each end portion of the electrode assembly in which a positive electrode plate and a negative electrode plate are stacked in layers. The backing member is composed of a base and a skirt.

20 Claims, 17 Drawing Sheets

(51) Int. Cl.
*H01G 11/82* (2013.01)
*H01M 2/26* (2006.01)
*H01G 11/38* (2013.01)
*H01G 11/68* (2013.01)
*H01M 2/14* (2006.01)
*H01M 2/18* (2006.01)
*H01M 10/052* (2010.01)

(52) U.S. Cl.
CPC .............. *H01G 11/82* (2013.01); *H01M 2/14* (2013.01); *H01M 2/18* (2013.01); *H01M 2/263* (2013.01); *H01M 10/0431* (2013.01); *H01M 10/0436* (2013.01); *H01M 10/052* (2013.01); *Y02E 60/13* (2013.01)

(56) References Cited

U.S. PATENT DOCUMENTS

2006/0024578 A1 2/2006 Lee
2007/0117009 A1 5/2007 Yamauchi et al.
2009/0004562 A1 1/2009 Inagaki et al.
2010/0203371 A1 8/2010 Nagai et al.
2011/0052976 A1 3/2011 Ishii et al.
2011/0195286 A1 8/2011 Aota et al.
2014/0030562 A1 1/2014 Ishii et al.

FOREIGN PATENT DOCUMENTS

| JP | 2005-528741 | A | 9/2005 |
|---|---|---|---|
| JP | 2006-12836 | A | 1/2006 |
| JP | 2006-40901 | A | 2/2006 |
| JP | 2007-149353 | A | 6/2007 |
| JP | 2009-26705 | A | 2/2009 |
| JP | 2009-32670 | A | 2/2009 |
| JP | 2011-049065 | A | 3/2011 |
| JP | 2011-71109 | A | 4/2011 |
| JP | 2011-165437 | A | 8/2011 |
| JP | 2011-165437 | * | 6/2016 |

\* cited by examiner

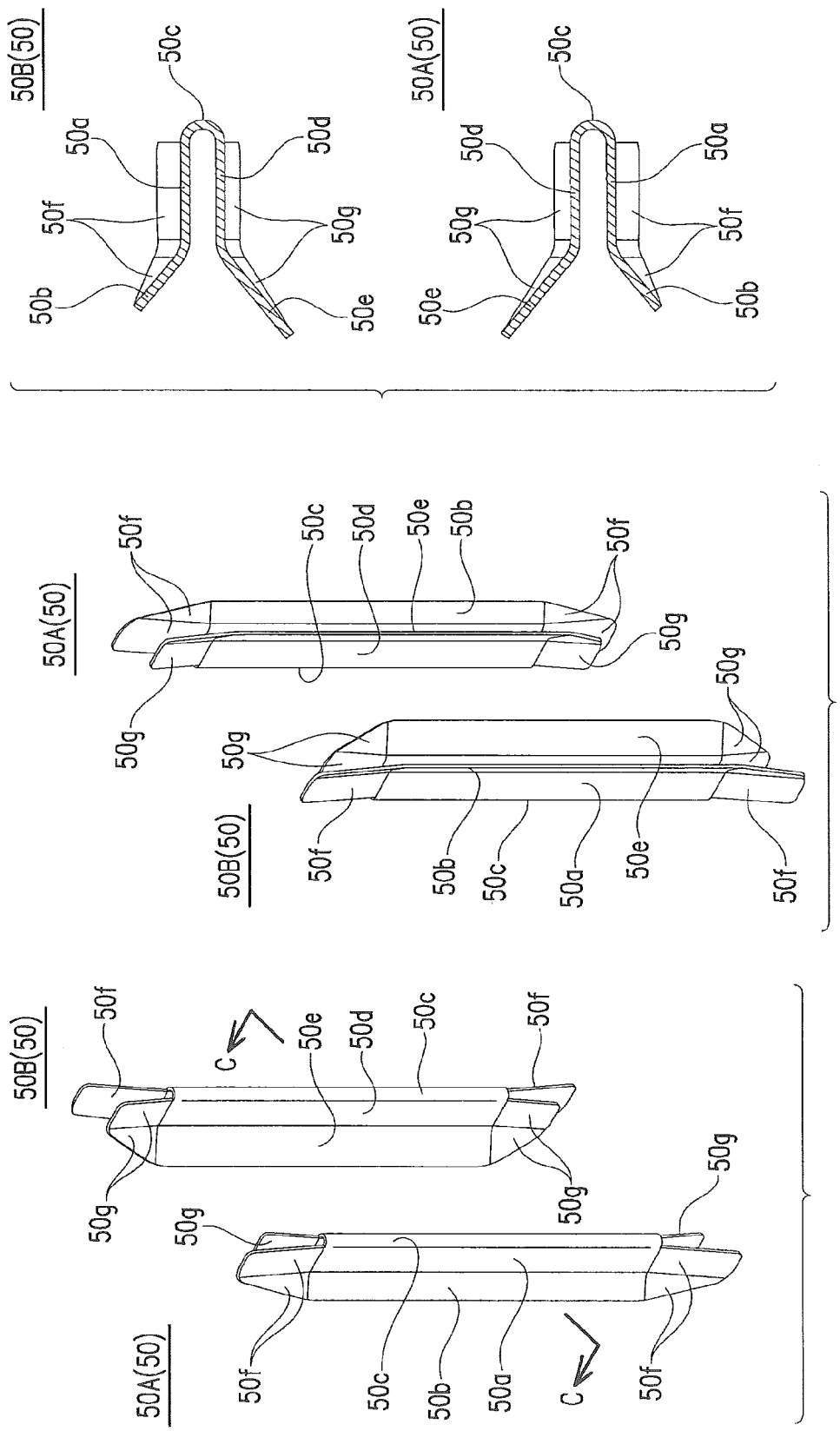

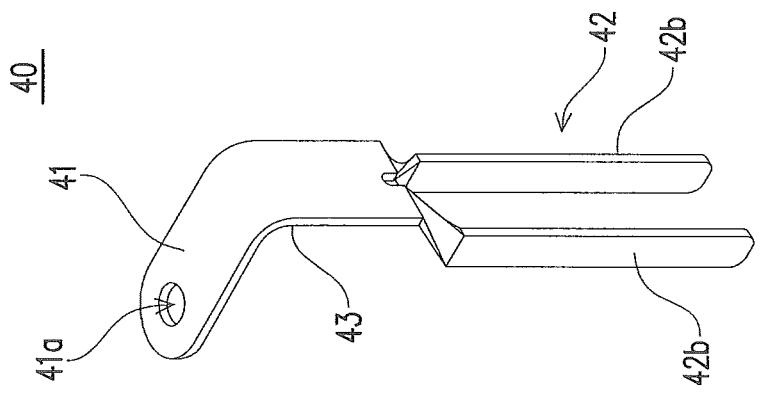
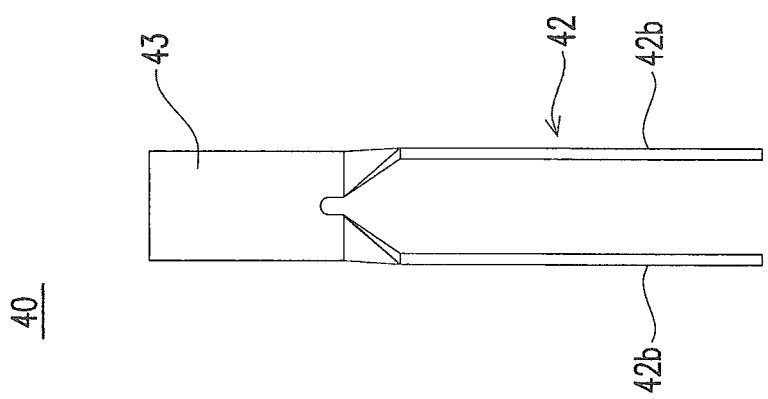
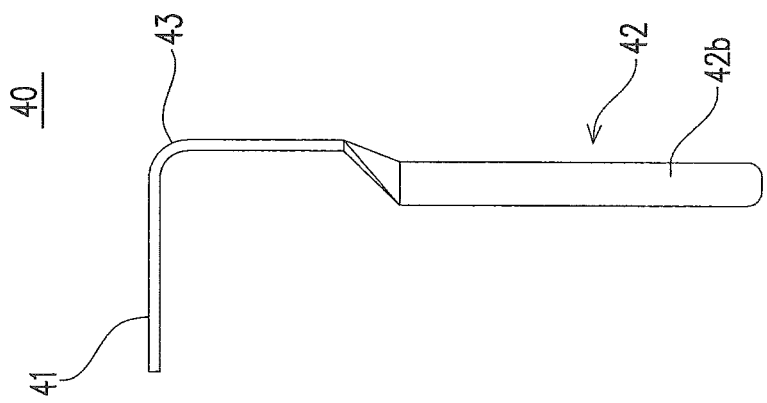

Prior art

ELECTRIC STORAGE DEVICE

FIELD

The present invention relates to an electric storage device including an electrode assembly in which a positive electrode plate and a negative electrode plate are stacked, and a current collector connected to the electrode assembly.

BACKGROUND

In recent years, rechargeable electric storage devices including battery cells such as lithium ion battery cells and nickel hydrogen battery cells, and capacitors such as electric double layer capacitors are employed as a power source for vehicles such as cars and motorcycles, and various equipment such as mobile terminals and notebook computers. For example, various types of battery cells are provided. As one of the examples, a battery cell including a flat electrode assembly in which a positive electrode plate and a negative electrode plate are wound in an insulated state from each other, and a current collector connected to the electrode assembly is provided.

As shown in FIG. 15C, the electrode assembly is formed by stacking a separator 23, a negative electrode plate 22, a separator 23, and a positive electrode plate 21 in this order from the inside, winding the stack into a cylindrical shape, and pressing the side surfaces of the cylindrical stack from both sides so as to deform the stack into a flat shape. Alternatively, the electrode assembly is formed by stacking a separator 23, a negative electrode plate 22, a separator 23, and a positive electrode plate 21 in this order from the inside and winding the stack into a flat shape.

As shown in FIG. 15A, the positive electrode plate 21 includes a positive electrode active material layer (positive electrode active material coating) 21b on each of both surfaces of a positive electrode collector substrate 21a formed, for example, by applying a positive electrode active material paint onto one surface of a positive electrode collector substrate 21a composed of a strip-shaped aluminum foil, followed by drying, and thereafter applying the same positive electrode active material paint onto the opposite surface of the positive electrode collector substrate 21a, followed by drying.

As shown in FIG. 15B, the negative electrode plate 22 includes a negative electrode active material layer (negative electrode active material coating) 22b on each of both surfaces of a negative electrode collector substrate 22a formed, for example, by applying a negative electrode active material paint onto one surface of a negative electrode collector substrate 22a composed of a strip-shaped copper foil, followed by drying, and thereafter applying the same negative electrode active material paint onto the opposite surface of the negative electrode collector substrate 22a, followed by drying.

More specifically, the positive electrode plate 21 includes the positive electrode active material layer 21b on each of both surfaces of the positive electrode collector substrate 21a excluding one end portion in the width direction, for example, by applying the positive electrode active material paint onto each of both surfaces excluding the one end portion of the positive electrode collector substrate 21a. Therefore, the one end portion serves as a portion where the positive electrode collector substrate 21a is exposed (positive electrode active material layer-unformed portion 21c). On the other hand, the negative electrode plate 22 includes the negative electrode active material layer 22b on each of both surfaces of the negative electrode collector substrate 22a excluding one end portion in the width direction, for example, by applying the negative electrode active material paint onto each of both surfaces excluding the one end portion of the negative electrode collector substrate 22a. Therefore, the one end portion serves as a portion where the negative electrode collector substrate 22a is exposed (negative electrode active material layer-unformed portion 22c).

As shown in FIG. 15C, each separator 23 serves to physically isolate the positive electrode plate 21 and the negative electrode plate 22 from each other, and to retain an electrolyte.

It should be noted that the negative electrode active material layer 22b is coated to a width larger than that of the positive electrode active material layer 21b in consideration of deposition of dendrite, etc. Further, the separator 23 has a width larger than that of the positive electrode active material layer 21b and the negative electrode active material layer 22b for securing the insulation. However, the separator 23 has a width so as not to cover the positive electrode active material layer-unformed portion 21c and the negative electrode active material layer-unformed portion 22c that project in the width direction.

An electrode assembly 20 is formed by winding the positive electrode plate 21, the negative electrode plate 22, and the separators 23. At this time, the positive electrode plate 21 and the negative electrode plate 22 are shifted from each other to the left and right in the width direction, thereby allowing the positive electrode active material layer-unformed portion 21c in a stacked state to project from a lateral end of the negative electrode plate 22 on one end side of the electrode assembly 20, and allowing the negative electrode active material layer-unformed portion 22c in a stacked state to project from a lateral end of the positive electrode plate 21 on the other end side of the electrode assembly 20, as shown in FIG. 16A. Thus, the electrode assembly 20 has positive electrode projections 20a on one end side, and has negative electrode projections 20a on the other end side.

Further, as shown in FIG. 16B, each of the positive electrode projections 20a has a bound portion 20b formed, before the projection 20a is bonded to a current collector 40, by bringing pieces of the projection 20a on the distal end side into tight contact with each other thereby binding them together, and a sloping portion 20c sloping from the proximal end side of the projection 20a toward the bound portion 20b. Similarly, each of the negative electrode projections 20a of the electrode assembly 20 also has a bound portion 20b formed, before the projection 20a is bonded to a current collector 40, by bringing pieces of the projection 20a on the distal end side into tight contact with each other thereby binding them together, and a sloping portion 20c sloping from the proximal end side of the projection 20a toward the bound portion 20b.

As shown in FIG. 16C, the positive electrode current collector 40, for example, composed of aluminum or aluminum alloy is arranged on one surface of the bound portion 20b of the positive electrode projection 20a, and a backing plate 50 similarly composed of aluminum or aluminum alloy is arranged on the other surface of the bound portion 20b thereof. The current collector 40 and the backing plate 50 are bonded to each other, for example, by ultrasonic bonding together with the bound portion 20b. The negative electrode current collector 40, for example, composed of copper or copper alloy is arranged on one surface of the bound portion 20b of the negative electrode projection 20a, and a backing plate 50 similarly composed of copper or copper alloy is arranged on the other surface of the bound portion 20b thereof. The current collector 40 and the backing plate 50 are bonded to each other, for example, by ultrasonic bonding together with the bound portion 20b.

Meanwhile, in the sloping portions 20c of the projections 20a, the positive electrode active material layers 21b are not formed on the positive electrode collector substrates 21a, or the negative electrode active material layers 22b are not formed on the negative electrode collector substrates 22a. Therefore, a gap is formed between adjacent positive electrode active material layer-unformed portions 21c, or between adjacent negative electrode active material layer-unformed portions 22c. Therefore, the sloping portions 20c are comparatively susceptible to compressive deformation due to the force received from the bound portions 20b.

Accordingly, for example, in a battery cell mounted on a car, if vibration occurs during traveling, the current collectors 40 vibrate at a different amplitude or frequency from that of the electrode assembly 20, which may possibly cause damage to the sloping portions 20c due to the edges of the backing plates 50 rubbing or abutting the sloping portions 20c. Damage to the sloping portions 20c tends to cause defects such as a decrease in the current collecting function, and an increase in internal resistance of the battery cell.

CITATION LIST

Patent Literature

Patent Literature 1: JP 2011-071109 A

SUMMARY

Technical Problem

Therefore, an object of the present invention is to provide an electric storage device capable of suitably preventing damage to an end portion of an electrode assembly due to vibration.

Solution to Problem

An electric storage device according to the present invention includes: an electrode assembly formed by stacking a positive electrode plate and a negative electrode plate, the electrode assembly having a projection formed by at least one of the positive electrode plate and the negative electrode plate projecting in a stacked state, the projection having a bound portion formed by binding a distal end side of the projection and a sloping portion sloping from a proximal end side of the projection toward the bound portion; a backing member arranged to face at least one of both surfaces of the bound portion; a current collector having a connection piece arranged to face at least the other of both surfaces of the bound portion; a case housing the electrode assembly, the backing member, and the current collector, the electrode assembly being supported by the current collector within the case, wherein the backing member has a base extending along a surface of the bound portion, and a skirt extending from the base toward a proximal end side of the projection along a surface of the sloping portion.

According to such a configuration, the skirt of the backing member extends from the base toward the proximal end side of the projection along the surface of the sloping portion. Therefore, damage to the sloping portion due to the edge of the backing member rubbing or abutting the sloping portion does not occur.

According to one aspect, the electric storage device of the present invention may have a configuration in which the backing member further has a reinforcing piece coupled to the base and the skirt.

According to such a configuration, it is possible to enhance the rigidity of the skirt to the base and to improve the strength of the backing member.

In this case, it is also possible to employ a configuration in which the bound portion is formed in a partial region of the projection in a second direction intersecting a first direction in which the projection projects, the projection has a second sloping portion sloping toward the bound portion in the second direction, and the reinforcing piece is provided in an end portion of the backing member so as to extend along a surface of the second sloping portion.

According to such a configuration, the reinforcing piece of the backing member extends from the end portion of the backing member along the surface of the second sloping portion. Therefore, even if relative displacement between the backing member and the projection in the second direction occurs due to vibration, damage to the second sloping portion due to the edge of the reinforcing piece of the backing member rubbing or abutting the second sloping portion does not occur. Further, it is possible to support a wide range of the second sloping portion having a low mechanical strength by the reinforcing piece of the backing member. Therefore, the second sloping portion is prevented from wrinkling due to vibration, etc. Thus, damage, etc., to the second sloping portion due to such wrinkles is also made less likely to occur. That is, the reinforcing piece serves as a skirt in the second direction.

According to another aspect, the electric storage device according to the present invention may have a configuration in which the backing member has a base and a skirt also on the other side of both surfaces of the bound portion.

According to such a configuration, the backing member is in the form of a clip. That is, the projection of the electrode assembly is bound by a pair of bases and a pair of skirts of the backing member. Therefore, damage to the sloping portion due to the edge of the backing member rubbing or abutting the sloping portion does not occur on both surfaces of the sloping portion.

According to still another aspect, the electric storage device according to the present invention may have a configuration in which the projection includes a first projection and a second projection that faces the first projection with a gap therebetween, the backing member includes a first backing member arranged on an outer surface of the first projection and a second backing member arranged on an outer surface of the second projection, the first backing member has a base and a skirt also on an inner surface side of the first projection, and the second backing member has a base and a skirt also on an inner surface side of the second projection.

According to such a configuration, each of the first backing member and the second backing member is in the form of a clip. That is, the first projection is bound by a pair of bases and a pair of skirts of the first backing member, and the second projection is bound by a pair of bases and a pair of skirts of the second backing member. Therefore, damage to the sloping portions due to the edges of the backing members rubbing or abutting the sloping portions does not occur on both the outer surface and the inner surface of the sloping portions.

In this case, it is also possible to employ a configuration in which a distal end of one of the skirts of the first backing member that is located on the second backing member side and a distal end of one of the skirts of the second backing member that is located on the first backing member side are coupled to each other.

According to such a configuration, the first backing member and the second backing member are integrated, which not only can enhance the strength of the backing members, but also can enhance the coupling strength of the backing members to the projections of the electrode assembly (the first and second projections).

According to still another aspect, the electric storage device according to the present invention may have a configuration in which the projection includes a first projection and a second projection that faces the first projection with a gap therebetween, and the backing member includes a first backing member arranged on an inner surface of the first projection and a second backing member arranged on an inner surface of the second projection.

According to such a configuration, the inner surface of the sloping portion of the first projection is protected by the skirt of the first backing member, and the inner surface of the sloping portion of the second projection is protected by the skirt of the second backing member.

In this case, it is also possible to employ a configuration in which a distal end of the skirt of the first backing member and a distal end of the skirt of the second backing member are coupled to each other.

According to such a configuration, the first backing member and the second backing member are integrated, which not only can enhance the strength of the backing members, but also can enhance the coupling strength of the backing members to the projections of the electrode assembly (the first and second projections).

In this case, it is also possible to employ a configuration in which the backing member further has a coupling piece coupling the side edges of the first backing member and the side edges of the second backing member in the second direction intersecting the first direction in which the projection projects.

According to such a configuration, the backing member has a three-dimensional solid structure, thereby achieving high mechanical strength. Accordingly, for example, in the case where the backing member is formed by molding a plate member, a thin plate member can be used to achieve a weight reduction.

In this case, it is also possible to employ a configuration in which the coupling piece covers a lateral opening formed by the side edges of the first backing member and the side edges of the second backing member.

According to such a configuration, the backing member is in the form of a cup, thereby achieving high mechanical strength. Accordingly, for example, in the case where the backing member is formed by molding a plate member, a thin plate member can be used to achieve a weight reduction.

According to still another aspect, the electric storage device according to the present invention may have a configuration in which the electrode plate includes a collector substrate and an active material layer formed on a surface of the collector substrate excluding one end portion, the one end portion of the collector substrate is an active material layer-unformed portion where the active material layer is not formed, and the projection is formed of the active material layer-unformed portion.

According to such a configuration, a gap tends to be formed between adjacent active material layer-unformed portions in the sloping portion of the projection. Therefore, the sloping portion is comparatively susceptible to compressive deformation due to the force received from the bound portions. However, the backing member configured as above can suitably prevent damage, etc., to the sloping portion.

According to still another aspect, the electric storage device according to the present invention may have a configuration in which the electrode assembly is formed by winding the positive electrode plate and the negative electrode plate in an insulated state from each other into a flat shape, the electrode assembly having a pair of folded portions that are opposite from each other across the center axis of winding and a flat portion that is located between the pair of folded portions, the projection is formed in an end portion of the electrode assembly in a direction of the center axis of winding, the bound portion is formed in the flat portion in the end portion of the electrode assembly, the second sloping portion is formed in the end portion of the electrode assembly, the backing member is arranged on an outer surface of the end portion of the electrode assembly, and the reinforcing piece extends along an outer surface of the second sloping portion.

According to such a configuration, the reinforcing piece of the backing member extends from the end portion of the backing member along the surface of the second sloping portion. Therefore, even if relative displacement between the backing member and the projection in the second direction occurs due to vibration, damage to the second sloping portion due to the edge of the reinforcing piece of the backing member rubbing or abutting the second sloping portion does not occur. Further, it is possible to support a wide range of the second sloping portion having a low mechanical strength by the reinforcing piece of the backing member. Therefore, the second sloping portion is prevented from wrinkling due to vibration, etc. Thus, damage, etc., to the second sloping portion due to such wrinkles is also made less likely to occur. That is, the reinforcing piece serves as a skirt in the second direction.

According to still another aspect, the electric storage device according to the present invention may have a configuration in which the skirt extends to a proximal end of the projection.

According to such a configuration, it is possible to entirely support the sloping portion having the lowest mechanical strength by the skirt of the backing member. Therefore, the sloping portion is prevented from wrinkling due to vibration, etc. Thus, damage, etc., to the sloping portion due to such wrinkles is also made less likely to occur.

Advantageous Effects of Invention

As described above, the electric storage device according to the present invention can suitably prevent damage to an end portion of an electrode assembly due to vibration. Therefore, it is also possible to suitably prevent a decrease in current collecting function and an increase in internal resistance of a battery cell due to damage to the end portion of the electrode assembly.

BRIEF DESCRIPTION OF DRAWINGS

FIG. 4A shows a perspective view, as seen from one side, of backing members of the battery cell.

FIG. 4B shows a perspective view, as seen from the opposite side, of the backing members of the battery cell.

FIG. 4C shows a sectional view, taken along the line C-C in FIG. 4A, of the backing members of the battery cell.

FIG. 10A shows a front view of a current collector of the battery cell.

FIG. 10B shows a side view of the current collector of the battery cell.

FIG. 10C shows a perspective view of the current collector of the battery cell.

DESCRIPTION OF EMBODIMENTS

First Embodiment

Hereinafter, a first embodiment of a battery cell according to the present invention is described in detail with reference to FIG. 1 to FIG. 7C.

Figure 1:
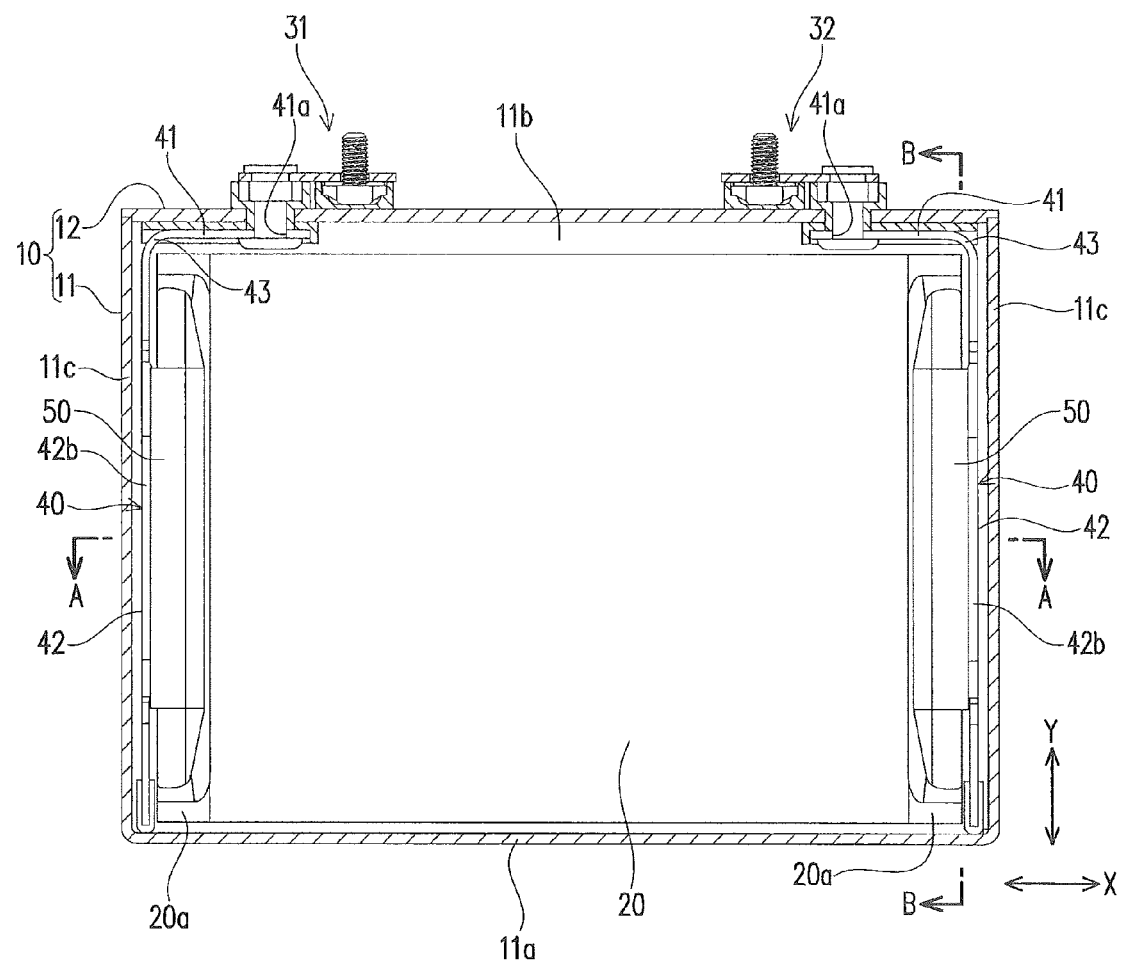
FIG. 1 shows a front view of a partially fractured cross section of a battery cell according to a first embodiment.
Figure 2:
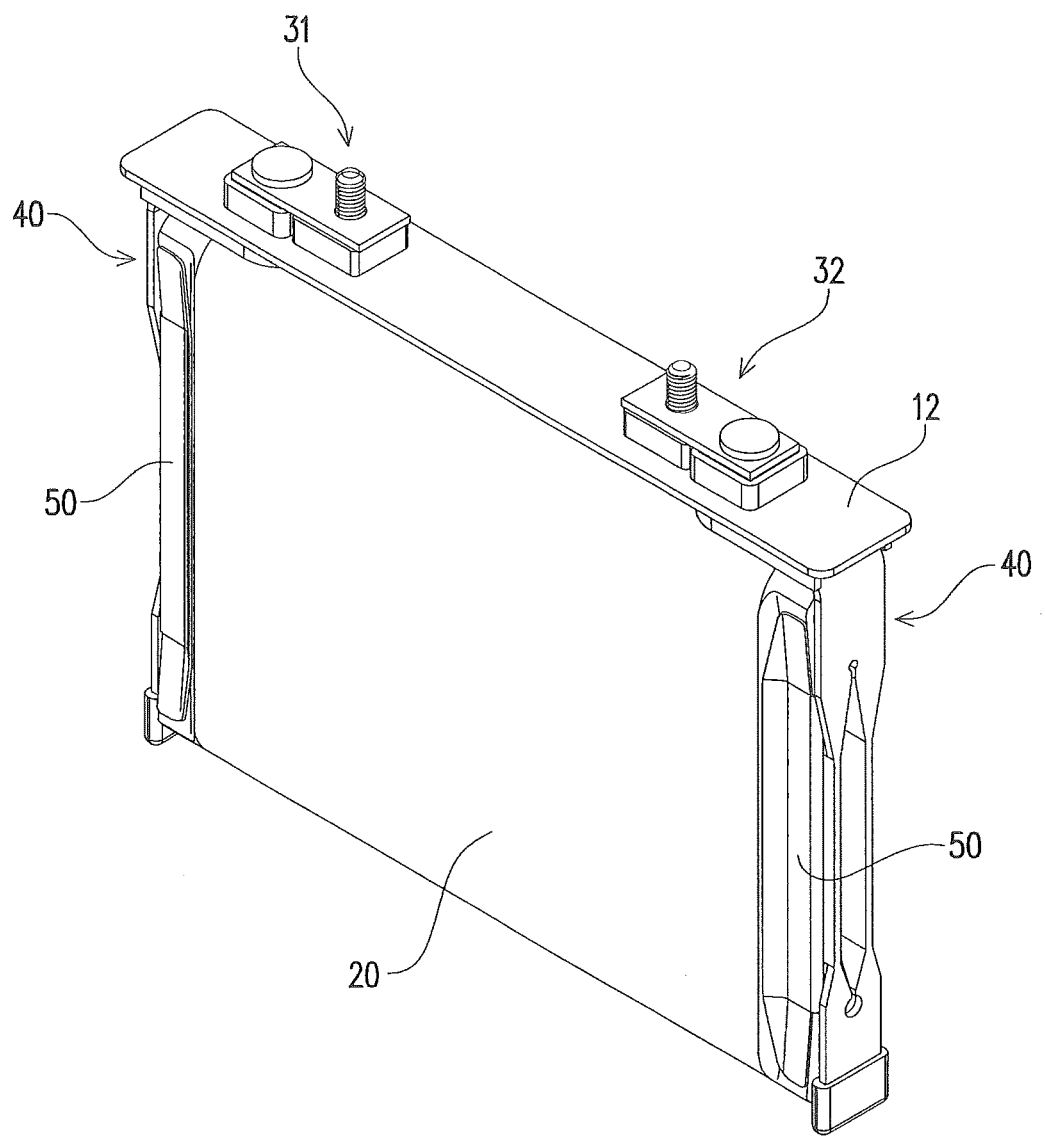
FIG. 2 shows a perspective view of a structure to be housed within a case of the battery cell.

As shown in FIG. 1 and FIG. 2, a battery cell according to the first embodiment includes a case 10 made of metal, an electrode assembly 20 that is housed inside the case 10, a positive electrode terminal 31 and a negative electrode terminal 32 projecting from the inside to the outside of the case 10, current collectors 40 connecting end portions of the electrode assembly 20 to the electrode terminals 31 and 32, backing members 50 cooperating with the current collectors 40 and connected to the end portions of the electrode assembly 20, and other components.

The case 10 is formed by combining a bottomed rectangular tubular case body 11 having an opening, and a cover plate 12 configured to cover the opening of the case body 11. After these two components 11 and 12 are assembled, the end edges of the opening of the case body 11 and the outer circumferential edges of the cover plate 12 are welded together, so that the two components 11 and 12 are integrated.

Further, the case body 11 is formed by providing a pair of opposed side plates 11b and a pair of opposed end plates 11c upright from the circumferential edges of a rectangular bottom part 11a. The case body 11 is formed into a thin, bottomed rectangular tubular shape having a small depth by setting the pair of end plates 11c to have a smaller width (than the pair of side plates 11b).

In the cover plate 12, holes (not numbered) through which the electrode terminals 31 and 32 pass are formed. The electrode terminals 31 and 32 pass through the holes of the cover plate 12, and are fixed to the cover plate 12 like rivets. Accordingly, the outer end portions of the electrode terminals 31 and 32 project from the cover plate 12, and the inner end portions of the electrode terminals 31 and 32 project into the case 10.

The electrode assembly 20 is configured in the same manner as in the conventional art. Accordingly, the description given for the electrode assembly 20 in Background above can substitute for a description for the electrode assembly 20. The electrode assembly 20 is housed in the case 10 in such a manner that the axis of the electrode assembly 20 is parallel to the bottom part 11a of the case 10, that is, a pair of projections 20a are opposed respectively to the end plates 11c of the case 10.

The current collectors 40 include a positive electrode current collector 40 configured to connect positive electrode projections 20a of the electrode assembly 20 to the positive electrode terminal 31, and a negative electrode current collector 40 configured to connect negative electrode projections 20a of the electrode assembly 20 to the negative electrode terminal 32. Each of the current collectors 40 includes an internal connector 41 to which the positive electrode terminal 31 or the negative electrode terminal 32 is connected by crimping like a rivet or by welding, an electrode attachment 42 directly or indirectly connected to the bound portions 20b of the positive electrode projections 20a or the bound portions 20b of the negative electrode projections 20a of the electrode assembly 20, and an intermediate portion 43 connecting the internal connector 41 and the electrode attachment 42. The current collector 40 is formed by molding one piece of metal material into a deformed L-shape in front view.

The positive electrode current collector 40, for example, is made of aluminum or aluminum alloy. The negative electrode current collector 40, for example, is made of copper or copper alloy.

In the current collector 40, the internal connector 41 and the electrode attachment 42 are oriented orthogonally to each other (L-shaped in front view) by being folded at the intermediate portion 43. The internal connector 41 is arranged to extend along the inner surface of the cover plate 12 of the case 10 while being insulated from the inner surface of the cover plate 12 of the case 10. A through hole 41a into which the inner end portion of the positive electrode terminal 31 or the negative electrode terminal 32 is fitted is provided in the distal end portion of the internal connector 41.

Figure 3A:
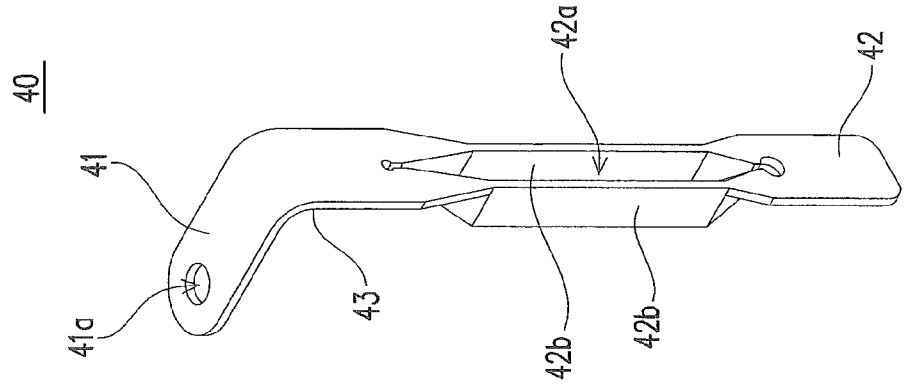
FIG. 3A shows a front view of a current collector of the battery cell.
Figure 3B:
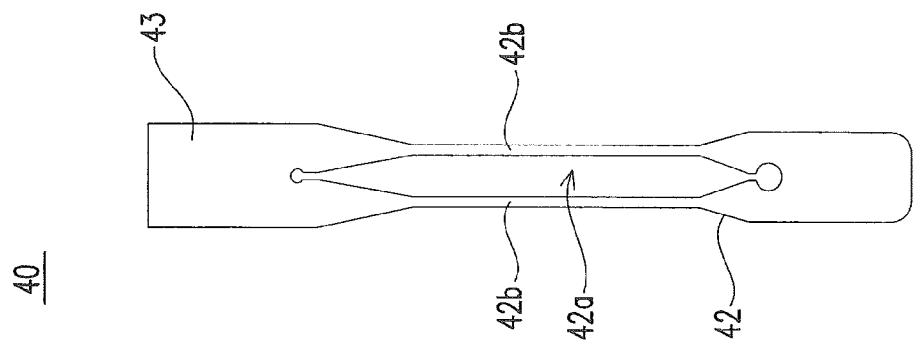
FIG. 3B shows a side view of the current collector of the battery cell.
Figure 3C:
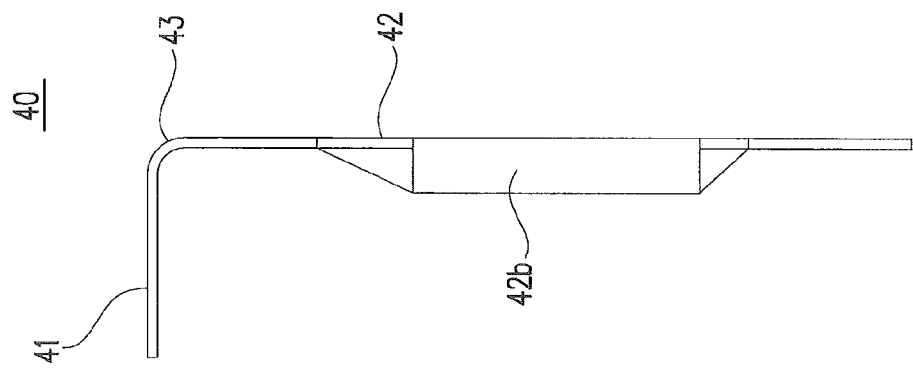
FIG. 3C shows a perspective view of the current collector of the battery cell.
Figure 5:
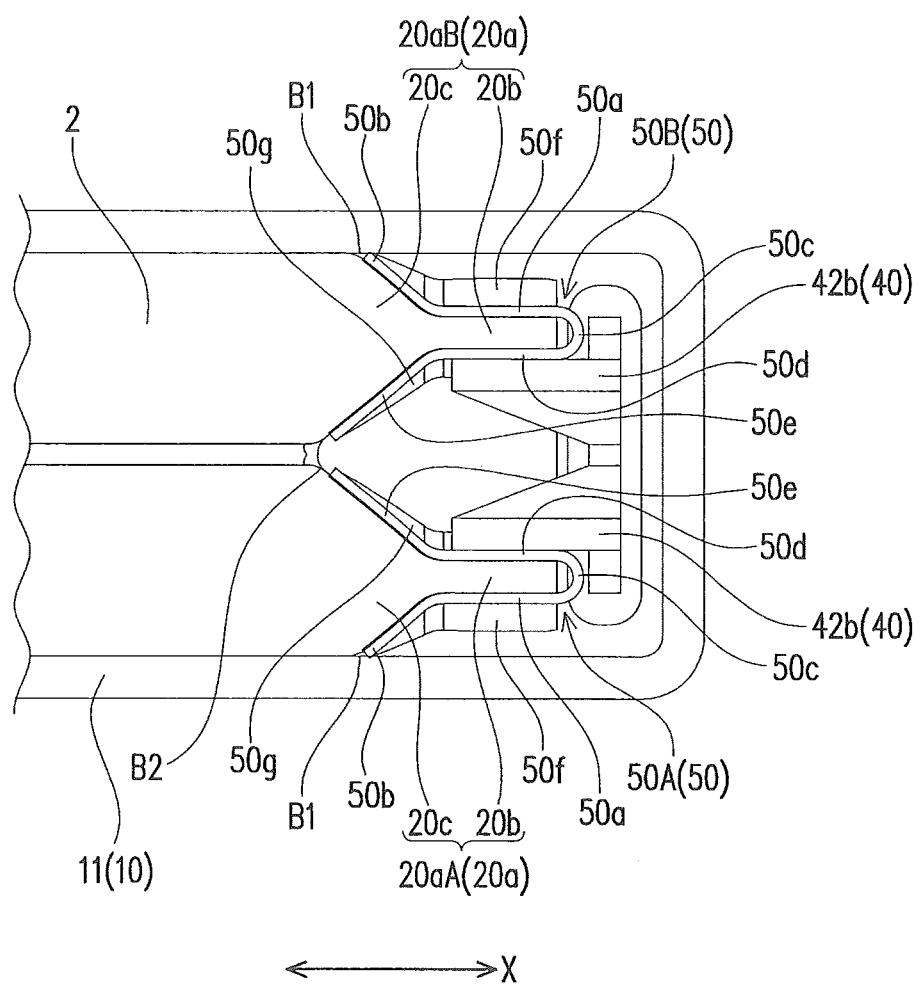
FIG. 5 shows a sectional view taken along the line A-A in FIG. 1.
Figure 6:
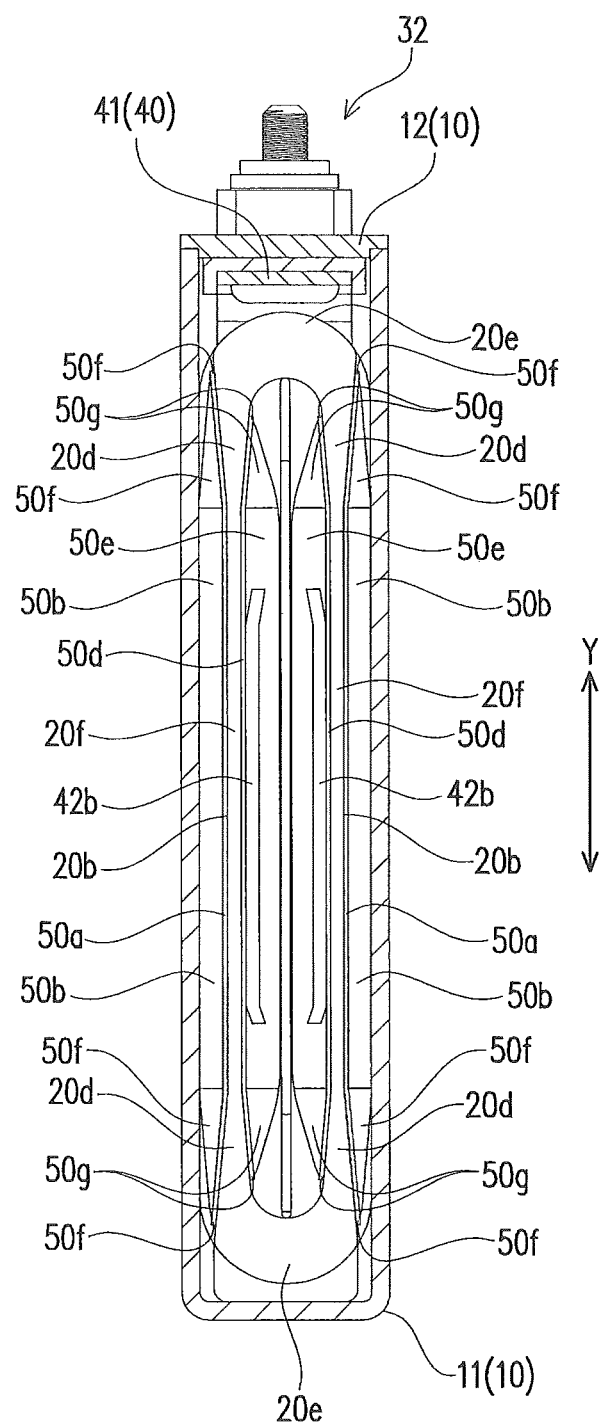
FIG. 6 shows a sectional view taken along the line B-B in FIG. 1.

The electrode attachment 42 is arranged between one end portion of the electrode assembly 20 and one of the end plates 11c of the case body 11. As shown in FIG. 3A to FIG. 3C, the electrode attachment 42 has an opening 42a. Two connection pieces 42b are provided on the two edges of the opening 42a so as to project therefrom in the same direction as the internal connector 41. The opening 42a and the connection pieces 42b are formed, for example, by forming a slit in the length direction in a strip-shaped plate from which the electrode attachment 42 is formed, and raising both sides of the slit.

As shown in FIG. 4A to FIG. 6, each of the backing members 50 has a base 50a extending along the outer surface of the bound portion 20b (of both surfaces of the bound portion 20b, the surface on the side farther from the center axis of winding) in the end portion of the electrode assembly 20, and a skirt 50b extending from the base 50a along the surface of the sloping portion 20c to a proximal end B1 of the projection 20a or to the vicinity of the proximal end B1. Further, the backing member 50 has a folded portion 50c folded back from the base 50a, a base 50d connected to the folded portion 50c and extending along the inner surface of the bound portion 20b (of both surfaces of the bound portion 20b, the surface on the side closer to the center axis of winding) in the end portion of the electrode assembly 20, and a skirt 50e extending from the base 50d along the surface of the sloping portion 20c to a proximal end B2 of the projection 20a or to the vicinity of the proximal end B2.

The backing members 50 include positive electrode backing members 50 connected to the positive electrode projections 20a of the electrode assembly 20 and negative electrode backing members 50 connected to the negative electrode projections 20a of the electrode assembly 20. Here, a pair of projections 20a of the electrode assembly 20 are formed in each of the positive electrode and the negative electrode. That is, the projections 20a of the electrode assembly 20 include a first projection 20aA and a second projection 20aB that faces the first projection 20aA with a gap therebetween. In accordance with this, the backing members 50 include a first backing member 50A for the first projection 20aA and a second backing member 50B for the second projection 20aB.

The positive electrode backing members 50, for example, are made of aluminum or aluminum alloy as the positive electrode current collector 40. The negative electrode backing members 50, for example, are made of copper or copper alloy as the negative electrode current collector 40. Further, each of the backing members 50 is formed by press-molding a plate member. Accordingly, the backing member 50 is a plate member in which the skirt 50b, the base 50a, the folded portion 50c, the base 50d, and the skirt 50e are continuously connected.

Figure 7A:
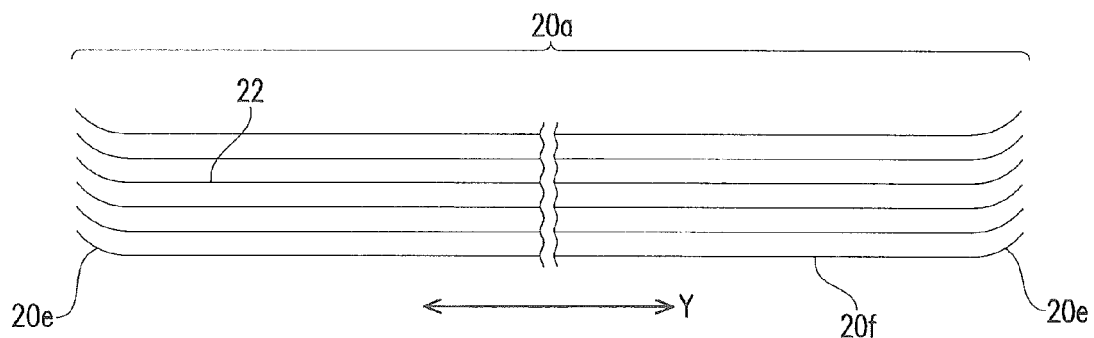
FIG. 7A shows a sectional view, taken along the line B-B in FIG. 1, of a partial region of the electrode assembly before it is bound.
Figure 7B:
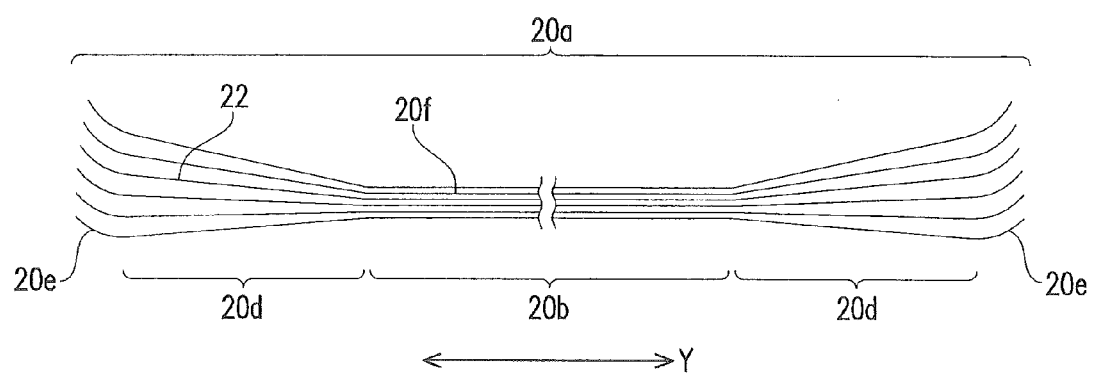
FIG. 7B shows a sectional view, taken along the line B-B in FIG. 1, of the partial region of the electrode assembly when it is bound.
Figure 7C:
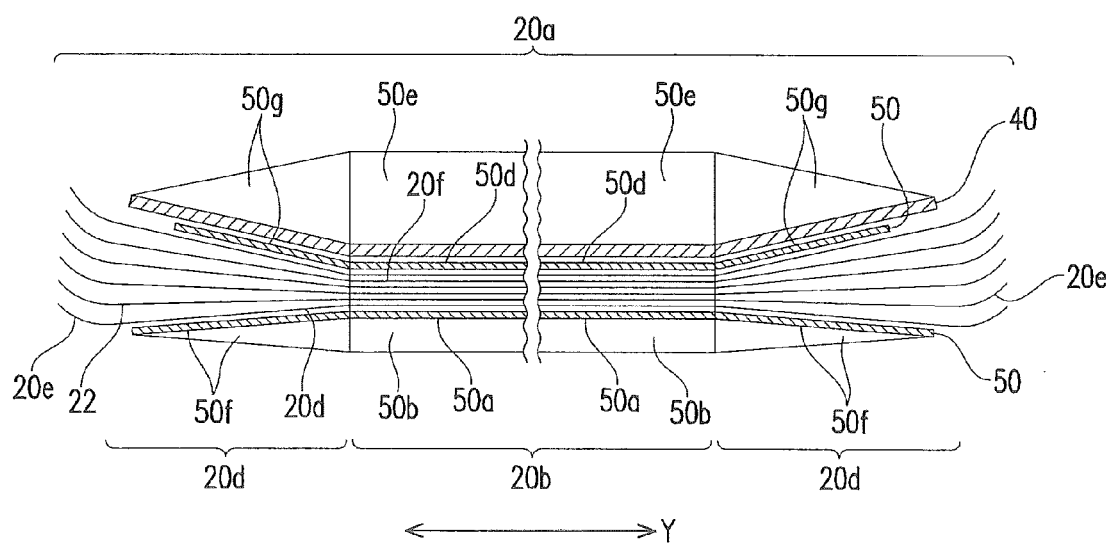
FIG. 7C shows a sectional view, taken along the line B-B in FIG. 1, of the partial region of the electrode assembly to which the current collector is bonded.
Figure 8:
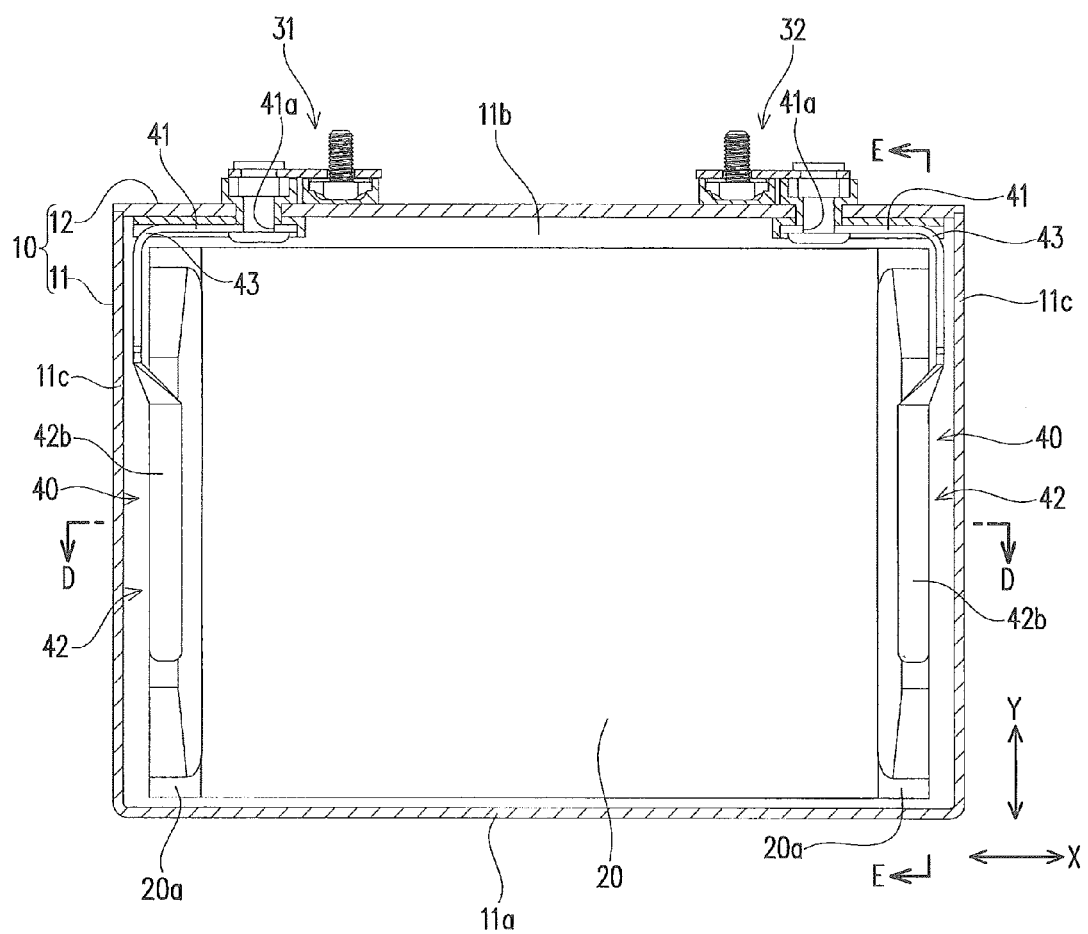
FIG. 8 shows a front view of a partially fractured cross section of a battery cell according to a second embodiment.
Figure 9:
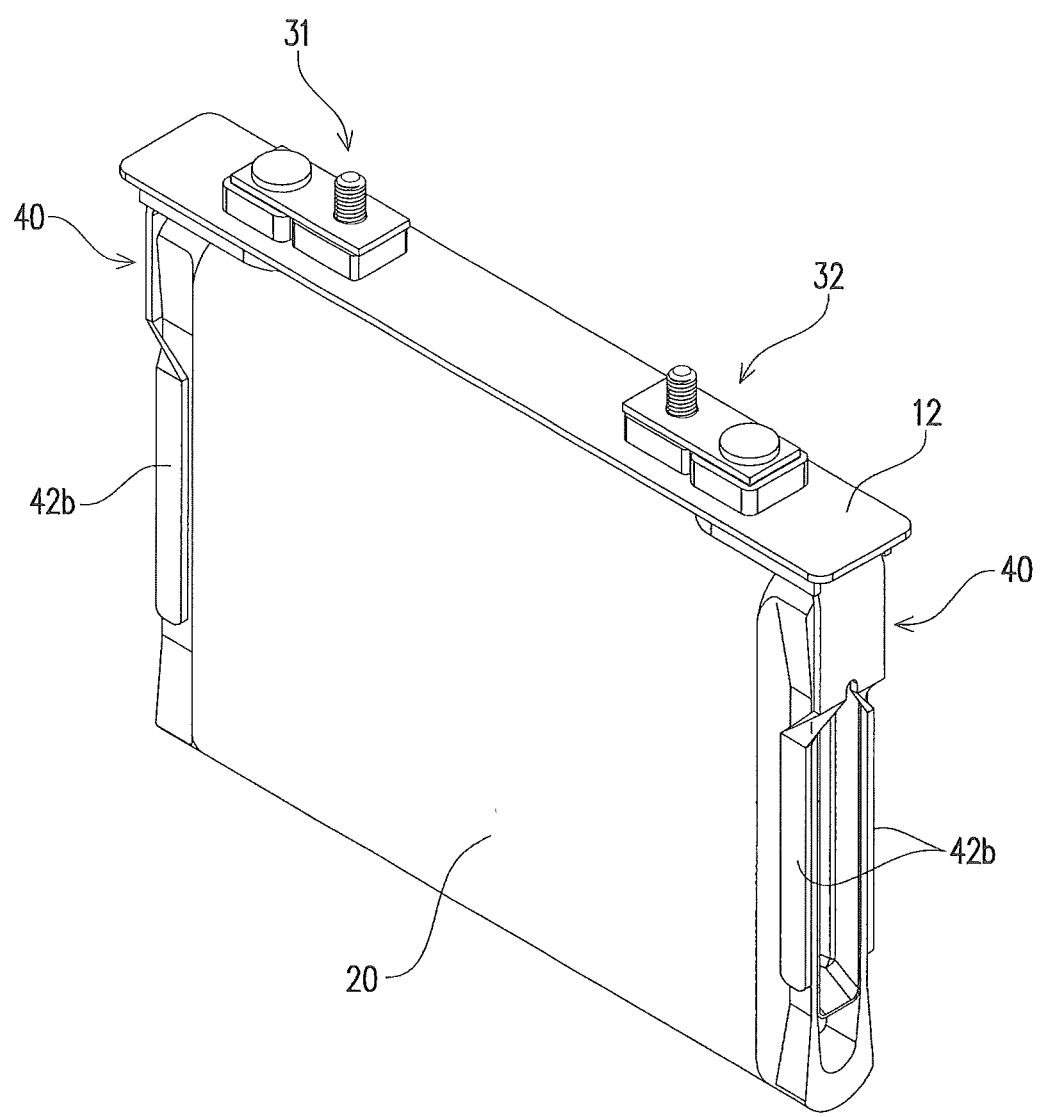
FIG. 9 shows a perspective view of a structure to be housed within a case of the battery cell.
Figure 11A:
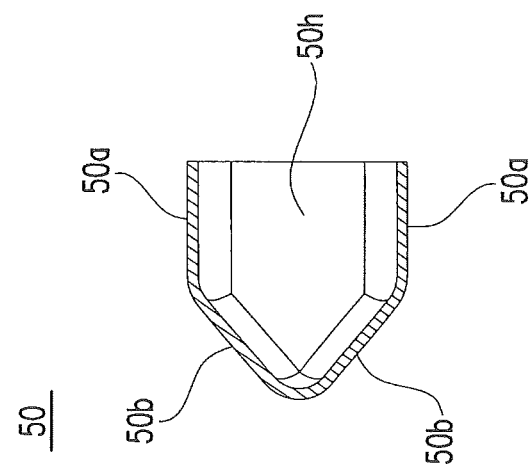
FIG. 11A shows a perspective view, as seen from one side, of a backing member of the battery cell.
Figure 11B:
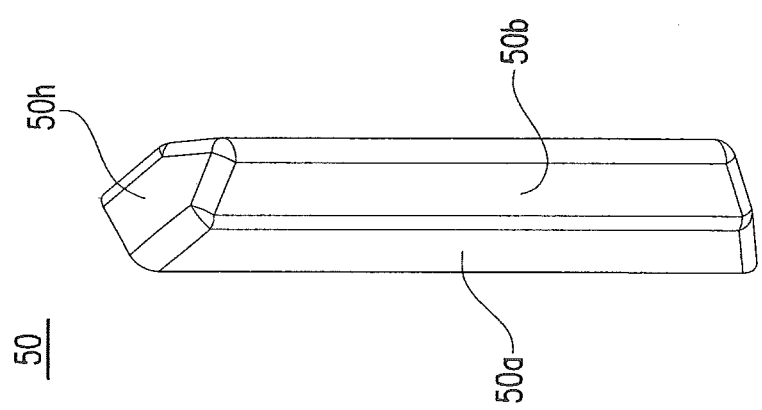
FIG. 11B shows a perspective view, as seen from the opposite side, of the backing member of the battery cell.
Figure 11C:
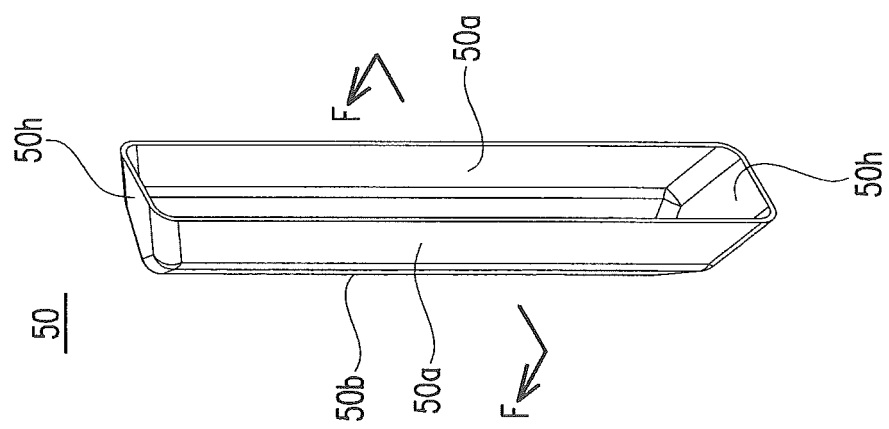
FIG. 11C shows a sectional view, taken along the line F-F in FIG. 11A, of the backing member of the battery cell.
Figure 12:
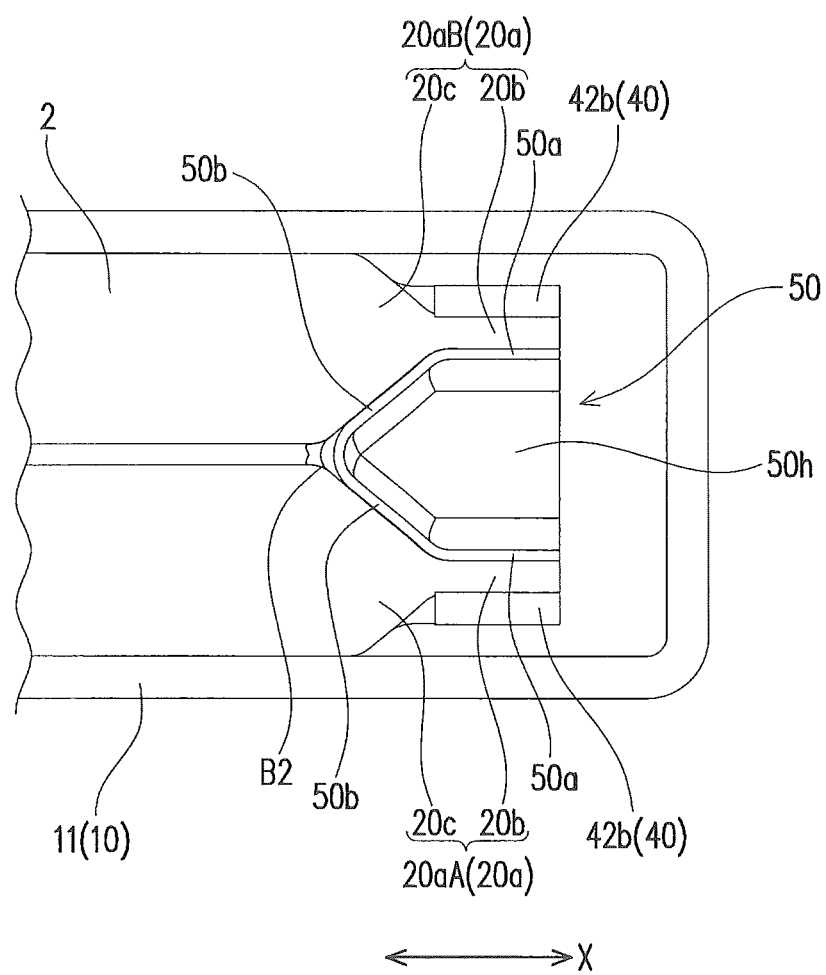
FIG. 12 shows a sectional view taken along the line D-D in FIG. 8.
Figure 13:
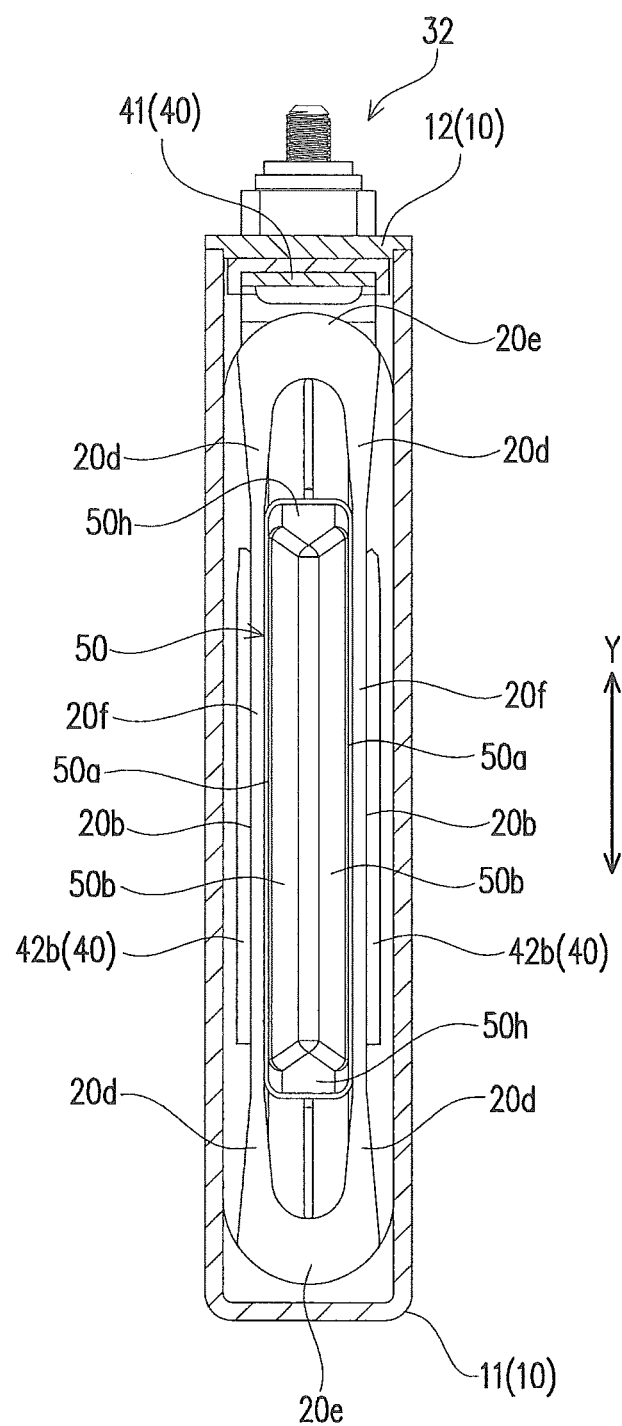
FIG. 13 shows a sectional view taken along the line E-E in FIG. 8.

As shown in FIG. 7A to FIG. 7C, the backing member 50 has reinforcing pieces 50f coupled to the base 50a and the skirt 50b at both end portions of the backing member 50. Here, the bound portion 20b of the projection 20a of the electrode assembly 20 is formed in a partial region of the projection 20a in a second direction Y intersecting a first direction X in which the projection 20a projects. Thus, the projection 20a has second sloping portions 20d sloping toward the bound portion 20b in the second direction Y. Specifically, the electrode assembly 20 is formed by winding the positive electrode plate 21 and the negative electrode plate 22 in an insulated state from each other into a flat shape, thereby having a pair of semiarcuate folded portions 20e that are opposite from each other across the center axis of winding and a flat portion 20f located between the pair of folded portions 20e. The bound portion 20b is formed in the flat portion 20f. Thus, two second sloping portions 20d, which are a second sloping portion 20d extending from one of the folded portions 20e toward the bound portion 20b and a second sloping portion 20d extending from the other of the folded portions 20e toward the bound portion 20b, are formed in the second direction Y. In accordance with this, the reinforcing pieces 50f extend gently sloping along the surfaces of the second sloping portions 20d in the second direction Y. It should be noted that reinforcing pieces 50g are formed also in end portions of the base 50d and the skirt 50e.

In the battery cell configured as above, the pair of connection pieces 42b of the current collector 40 are inserted into the space between the first projection 20aA and the second projection 20aB, where one of the connection pieces 42b is allowed to extend along the base 50d of the first backing member 50A, and the other of the connection pieces 42b is allowed to extend along the base 50d of the second backing member 50B. With such a state, an anvil is pressed against each of the connection pieces 42b, and an ultrasonic transducer is pressed against the base 50a of the backing member 50. Then, the ultrasonic transducer generates ultrasonic vibration so as to generate frictional heat, thereby allowing the connection piece 42b and the backing member 50 to be bonded by ultrasonic bonding together with the bound portion 20b.

Second Embodiment

Next, a second embodiment of the battery cell according to the present invention is described in detail with reference to FIG. 8 to FIG. 13. However, the first embodiment and the second embodiment are different from each other only in the configurations of the current collectors 40 and the backing members 50, and therefore such configurations are described below. For descriptions for other configurations, the descriptions given for the respective configurations in the first embodiment (and the description given for the electrode assembly 20 in Background) above can substitute.

As shown in FIG. 8 to FIG. 10C, the current collectors 40 include a positive electrode current collector 40 configured to connect the positive electrode projections 20a of the electrode assembly 20 to the positive electrode terminal 31, and a negative electrode current collector 40 configured to connect the negative electrode projections 20a of the electrode assembly 20 to the negative electrode terminal 32. Each of the current collectors 40 includes an internal connector 41 to which the positive electrode terminal 31 or the negative electrode terminal 32 is connected by crimping like a rivet or by welding, an electrode attachment 42 directly or indirectly connected to the bound portions 20b of the positive electrode projections 20a or the bound portions 20b of the negative electrode projections 20a of the electrode assembly 20, and an intermediate portion 43 connecting the internal connector 41 and the electrode attachment 42. The current collector 40 is formed by molding one piece of metal material into a deformed L-shape in front view.

The positive electrode current collector 40, for example, is made of aluminum or aluminum alloy. The negative electrode current collector 40, for example, is made of copper or copper alloy.

In the current collector 40, the internal connector 41 and the electrode attachment 42 are oriented orthogonally to each other (L-shaped in front view) by being folded at the intermediate portion 43. The internal connector 41 is arranged to extend along the inner surface of the cover plate 12 of the case 10 while being insulated from the inner surface of the cover plate 12 of the case 10. A through hole 41a into which the inner end portion of the positive electrode terminal 31 or the negative electrode terminal 32 is fitted is provided in the distal end portion of the internal connector 41.

The electrode attachment 42 has a bifurcated pair of connection pieces 42b extending in parallel along the same direction as the internal connector 41.

As shown in FIG. 11A to FIG. 13, each of the backing members 50 has bases 50a extending along the inner surfaces of the bound portions 20b (of both surfaces of each bound portion 20b, the surface on the side closer to the center axis of winding) in the end portion of the electrode assembly 20, and skirts 50b extending from the bases 50a along the surfaces of the sloping portions 20c to a proximal end B2 of the projections 20a or to the vicinity of the proximal end B2. The bases 50a include a base 50a extending along the inner surface of the bound portion 20b of the first projection 20aA and a base 50a extending along the inner surface of the bound portion 20b of the second projection 20aB that faces the first projection 20aA with a gap therebetween. The skirts 50b include a skirt 50b extending along the inner surface of the sloping portion 20c of the first projection 20aA, and a skirt 50b extending along the inner surface of the sloping portion 20c of the second projection 20aB. Accordingly, the base 50a and the skirt 50b for the first projection 20aA correspond to the first backing member 50A, and the base 50a and the skirt 50b for the second projection 20aB correspond to the second backing member 50B.

The distal end of the skirt 50b of the first backing member 50A and the distal end of the skirt 50b of the second backing member 50B are coupled to each other. Further, the side edges of the first backing member 50A and the side edges of the second backing member 50B are coupled to each other by coupling pieces 50h, and the lateral openings formed by the first backing member 50A and the second backing member 50B are covered by the coupling pieces 50h. This allows the first backing member 50A and the second backing member 50B to be integrated and formed into a cup shape.

It is needless to say that the backing members 50 include a positive electrode backing member 50 connected to the positive electrode projections 20a of the electrode assembly 20, and a negative electrode backing member 50 connected to the negative electrode projections 20a of the electrode assembly 20. The positive electrode backing member 50, for example, is made of aluminum or aluminum alloy as the positive electrode current collector 40. The negative electrode backing member 50, for example, is made of copper or copper alloy as the negative electrode current collector 40. Further, each of the backing members 50 is formed by press-molding a plate member. Accordingly, the backing member 50 is a member in which the pair of bases 50a, the pair of skirts 50b, and the pair of coupling pieces 50h are continuously connected.

In the battery cell configured as above, the first projection 20aA and the second projection 20aB are inserted between the pair of connection pieces 42b of the current collector 40, where one of the connection pieces 42b is allowed to extend along the outer surface of the bound portion 20b of the first projection 20aA, and the other of the connection pieces 42b is allowed to extend along the outer surface of the bound portion 20b of the second projection 20aB. With such a state, an anvil is pressed against each of the connection pieces 42b, and an ultrasonic transducer is pressed against the base 50a of the backing member 50. Then, the ultrasonic transducer generates ultrasonic vibration so as to generate frictional heat, thereby allowing the connection piece 42b and the backing member 50 to be bonded by ultrasonic bonding together with the bound portion 20b.

As described above, the battery cell according to the first and second embodiments includes: the electrode assembly 20 formed by stacking the positive electrode plate 21 and the negative electrode plate 22, the electrode assembly 20 having the projection 20a formed by at least one of the positive electrode plate 21 and the negative electrode plate 22 projecting in a stacked state, the projection 20a having the bound portion 20b formed by binding a distal end side of the projection 20a and the sloping portion 20c sloping from the proximal end B1 side of the projection 20a toward the bound portion 20b; the backing member 50 arranged to face at least one of both surfaces of the bound portion 20b; the current collector 40 having the connection piece 42b arranged to face at least the other of both surfaces of the bound portion 20b; the case 10 housing the electrode assembly 20, the backing member 50, and the current collector 40, the electrode assembly 20 being supported by the current collector 40 within the case 10, wherein the backing member 50 has the base 50a extending along a surface of the bound portion 20b, and the skirt 50b extending from the base 50a toward the proximal end B1 side of the projection 20a along a surface of the sloping portion 20c. Thus, the skirt 50b of the backing member 50 extends from the base 50a toward the proximal end side of the projection 20a along the surface of the sloping portion 20c. Therefore, damage to the sloping portion 20c due to the edge of the backing member 50 rubbing or abutting the sloping portion 20c does not occur.

Further, according to the battery cell of the first and second embodiments, the backing member 50 further has the reinforcing piece 50 coupled to the base 50a and the skirt 50b. This can enhance the rigidity of the skirt 50b to the base 50a, and can improve the strength of the backing member 50.

Further, according to the battery cell of the first and second embodiments, the bound portion 20b is formed in a partial region of the projection 20a in the second direction Y intersecting the first direction X in which the projection 20a projects, the projection 20a has the second sloping portion 20d sloping toward the bound portion 20b in the second direction Y, and the reinforcing piece 50g is provided in the end portion of the backing member 50 so as to extend along the surface of the second sloping portion 20d. Thus, the reinforcing piece 50g of the backing member 50 extends from the end portion of the backing member 50 along the surface of the second sloping portion 20d. Therefore, even if relative displacement between the backing member 50 and the projection 20a in the second direction Y occurs due to vibration, damage to the second sloping portion 20d due to the edge of the reinforcing piece 50g of the backing member 50 rubbing or abutting the second sloping portion 20d does not occur. Further, it is possible to support a wide range of the second sloping portion 20d having a low mechanical strength by the reinforcing piece 50g of the backing member 50. Therefore, the second sloping portion 20d is prevented from wrinkling due to vibration, etc. Thus, damage, etc., to the second sloping portion 20*d* due to such wrinkles is also made less likely to occur. That is, the reinforcing piece 50*g* serves as a skirt in the second direction Y.

Further, according to the battery cell of the first and second embodiments, the backing member 50 has the base 50*d* and the skirt 50*e* also on the other side of both surfaces of the bound portion 20*b*. Thus, the backing member 50 is in the form of a clip. That is, the projection 20*a* of the electrode assembly 20 is bound by the pair of bases 50*a* and 50*d* and the pair of skirts 20*b* and 50*e* of the backing member 50. Therefore, damage to the sloping portion 20*c* due to the edge of the backing member 50 rubbing or abutting the sloping portion 20*c* does not occur on both surfaces of the sloping portion 20*c*.

Further, according to the battery cell of the first and second embodiments, the projection 20*a* includes the first projection 20*a*A and the second projection 20*a*B that faces the first projection 20*a*A with a gap therebetween, the backing member 50 includes the first backing member 50A arranged on an outer surface of the first projection 20*a*A and the second backing member 50B arranged on an outer surface of the second projection 20*a*B, the first backing member 50A has the base 50*d* and the skirt 50*e* also on an inner surface side of the first projection 20*a*A, and the second backing member 50B has the base 50*d* and the skirt 50*e* also on an inner surface side of the second projection 20*a*B. Thus, each of the first backing member 50A and the second backing member 50B is in the form of a clip. That is, the first projection 20*a*A is bound by the pair of bases 50*a* and 50*d* and the pair of skirts 50*b* and 50*e* of the first backing member 50A, and the second projection 20*a*B is bound by the pair of bases 50*a* and 50*d* and the pair of skirts 50*b* and 50*e* of the second backing member 50B. Therefore, damage to the sloping portions 20*c* due to the edges of the backing members 50 rubbing or abutting the sloping portions 20*c* does not occur on both the outer surface and the inner surface of the sloping portions 20*c*.

Further, according to the battery cell of the second embodiment, a distal end of the skirt 50*e*, of the skirts 50*b* and 50*e* of the first backing member 50A, that is located on the second backing member 50B side and a distal end of the skirt 50*e*, of the skirts 50*b* and 50*e* of the second backing member 50B, that is located on the first backing member 50A side are coupled to each other. Thus, the first backing member 50A and the second backing member 50B are integrated, which not only can enhance the strength of the backing members 50, but also can enhance the coupling strength of the backing members 50 to the projections 20*a* of the electrode assembly 20 (the first and second projections 20*a*A and 20*a*B).

Further, according to the battery cell of the first and second embodiments, the projection 20*a* includes the first projection 20*a*A and the second projection 20*a*B that faces the first projection 20*a*A with a gap therebetween, and the backing member 50 includes the first backing member 50A arranged on an inner surface of the first projection 20*a*A and the second backing member 50B arranged on an inner surface of the second projection 20*a*B. Thus, the inner surface of the sloping portion 20*c* of the first projection 20*a*A is protected by the skirt 50*e* of the first backing member 50A, and the inner surface of the sloping portion 20*c* of the second projection 20*a*B is protected by the skirt 50*e* of the second backing member 50B.

Further, according to the battery cell of the second embodiment, the distal end of the skirt 50*e* of the first backing member 50A and the distal end of the skirt 50*e* of the second backing member 50B are coupled to each other. Thus, the first backing member 50A and the second backing member 50B are integrated, which not only can enhance the strength of the backing members 50, but also can enhance the coupling strength of the backing members 50 to the projections 20*a* of the electrode assembly 20 (the first and second projections 20*a*A and 20*a*B).

Further, according to the battery cell of the second embodiment, the backing member 50 further has the coupling piece 50*h* coupling the side edges of the first backing member 50A and the side edges of the second backing member 50B in the second direction Y intersecting the first direction X in which the projections 20*a* projects. Thus, the backing member 50 has a three-dimensional solid structure, thereby achieving high mechanical strength. Accordingly, for example, in the case where the backing member 50 is formed by molding a plate member, a thin plate member can be used to achieve a weight reduction.

Further, according to the battery cell of the second embodiment, the coupling piece 50*h* covers the lateral opening formed by the side edges of the first backing member 50A and the side edges of the second backing member 50B. Thus, the backing member 50 is in the form of a cup, thereby achieving high mechanical strength. Accordingly, for example, in the case where the backing member 50 is formed by molding a plate member, a thin plate member can be used to achieve a weight reduction.

Further, according to the battery cell of the first and second embodiments, the electrode plates include the collector substrates 21*a* and 22*a* and the active material layers 21*b* and 22*b* formed on the surfaces of the collector substrates 21*a* and 22*a* excluding end portions on one side, the end portions on one side of the collector substrates 21*a* and 22*a* are the active material layer-unformed portions 21*c* and 22*c* where the active material layers 21*b* and 22*b* are not formed, and the projections 20*a* are formed of the active material layer-unformed portions 21*c* and 22*c*. This facilitates the formation of gaps between adjacent active material layer-unformed portions 21*c* and between adjacent active material layer-unformed portions 22*c* in the sloping portions 20*c* of the projections 20*a*. Therefore, the sloping portions 20*c* are comparatively susceptible to compressive deformation due to the force received from the bound portions 20*b*. However, the backing members 50 configured as above can suitably prevent damage, etc., to the sloping portions 20*c*.

Further, according to the battery cell of the first and second embodiments, the electrode assembly 20 is formed by winding the positive electrode plate 21 and the negative electrode plate 22 in an insulated state from each other into a flat shape, the electrode assembly 20 having the pair of folded portions 20*e* that are opposite from each other across the center axis of winding and the flat portion 20*f* located between the pair of folded portions 20*e*, the projection 20*a* is formed in an end portion of the electrode assembly 20 in the direction of the center axis of winding, the bound portion 20*b* is formed in the flat portion 20*f* in the end portion of the electrode assembly 20, the second sloping portion 20*d* is formed in the end portion of the electrode assembly 20, the backing member 50 is arranged on the outer surface of the end portion of the electrode assembly 20, and the reinforcing piece 50*g* extends along the outer surface of the second sloping portion 20*d*. Thus, the reinforcing piece 50*g* of the backing member 50 extends from the end portion of the backing member 50 along the surface of the second sloping portion 20*d*. Therefore, even if relative displacement between the backing member 50 and the projection 20*a* in the second direction Y occurs due to vibration, damage to the second sloping portion 20d due to the edge of the reinforcing piece 50g of the backing member 50 rubbing or abutting the second sloping portion 20d does not occur. Further, it is possible to support a wide range of the second sloping portion 20d having a low mechanical strength by the reinforcing piece 50g of the backing member 50. Therefore, the second sloping portion 20d is prevented from wrinkling due to vibration, etc. Thus, damage, etc., to the second sloping portion 20d due to such wrinkles is also made less likely to occur. That is, the reinforcing piece 50g serves as a skirt in the second direction Y.

Further, according to the battery cell of the first and second embodiments, the skirts 50b and 50e extend to the proximal ends B1 and B2 of the projections 20a. Thus, it is possible to support the sloping portion 20c having the lowest mechanical strength entirely by the skirts 50b and 50e of the backing member 50. Therefore, the sloping portion 20c is prevented from wrinkling due to vibration, etc. Thus, damage, etc., to the sloping portion due to such wrinkles is also made less likely to occur.

Accordingly, it is possible to suitably prevent damage to the end portions of the electrode assembly 20 due to vibration. Therefore, it is also possible to suitably prevent a decrease in current collecting function and an increase in internal resistance of a battery cell due to damage to the end portions of the electrode assembly 20. Thus, it is possible to suitably use a battery cell mounted on a vehicle such as a car and train powered by fuel cells.

It should be noted that the electric storage device according to the present invention is not limited to the above described embodiments. Various modifications can be made without departing from the gist of the present invention.

For example, in the above described embodiments, the electrode assembly 20 of a wound type formed by winding the positive electrode plate 21, the negative electrode plate 22, and the separator 23 each having an elongated shape is employed. However, an electrode assembly formed by stacking a plurality of positive electrode plates, negative electrode plates, and separators may be employed. It should be note that, since the electrode assembly 20 of a wound type has folded portions (semi-arcuate portions) 20e as mentioned above, it is impossible to form the bound portion 20b over the entire length in the second direction of the electrode assembly 20. However, in the electrode assembly of a stacked type, it is possible to form a bound portion and a sloping portion over the entire length in the second direction of the electrode assembly. However, it is also possible to provide the bound portion and the sloping portion partially in the second direction, such as to provide the bound portion and the sloping portion in the middle of the electrode assembly in the second direction, and to provide the bound portion and the sloping portion in an end portion of the electrode assembly in the second direction, in the same manner as in the electrode assembly 20 of a wound type.

Further, in the above described embodiments, the backing member 50 is used for both the positive electrode projection 20a and the negative electrode projection 20a. However, it may be used for only either one of them.

Figure 14A:
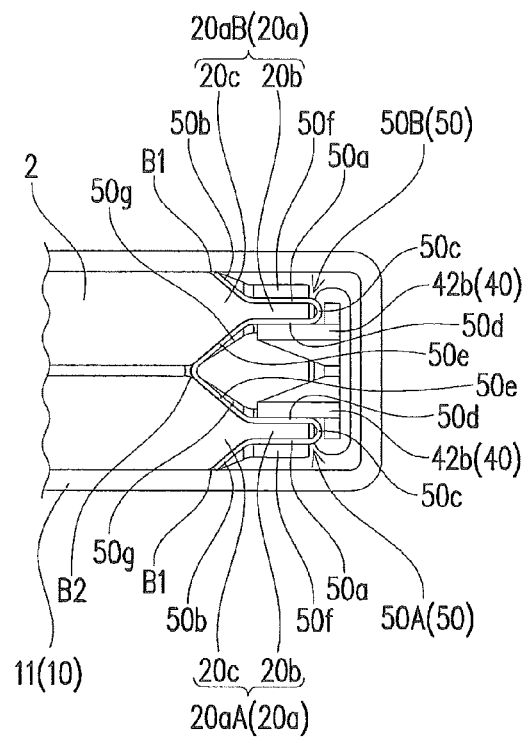
FIG. 14A shows one of various modifications.

Further, various forms of the backing member can be appropriately selected without departing from the scope of the present invention. For example, in the above described first embodiment, the distal end of the skirt 50e, of the pair of skirts 50b and 50e of the first backing member 50A, that is located on the second backing member 50B side and the distal end of the skirt 50e, of the pair of skirts 50b and 50e of the second backing member 50B, that is located on the first backing member 50A side may be coupled to each other, so that the first and second backing members 50A and 50B are integrated, as shown in FIG. 14A.

Figure 14B:
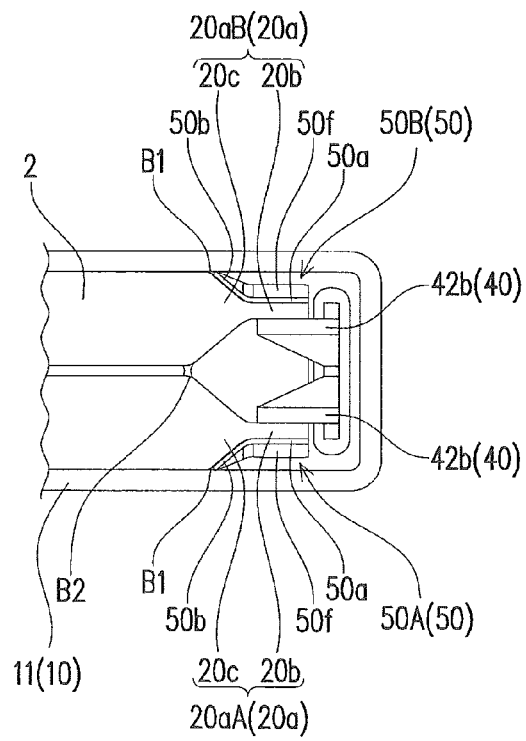
FIG. 14B shows one of various modifications.

Further, in the above described first embodiment, the folded portion 50c, the base 50d, and the skirt 50e, that is, a wrapping portion of the projection 20a around the inner surface side may be eliminated, as shown in FIG. 14B. In this case, the connection piece 42b of the current collector 40 is allowed to extend directly along the inner surface of the bound portion 20b.

Figure 14C:
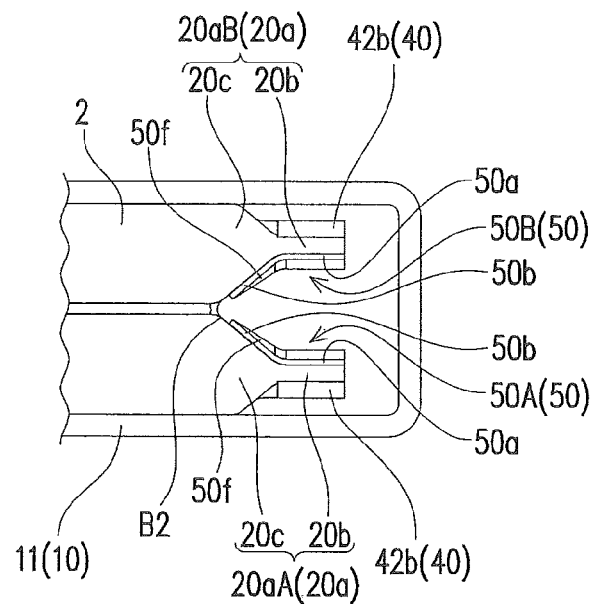
FIG. 14C shows one of various modifications.

Further, in the above described second embodiment, the pair of skirts 50b may be separated, as shown in FIG. 14C. In this case, the first backing member 50A and the second backing member 50B are separated from each other.

Figure 14D:
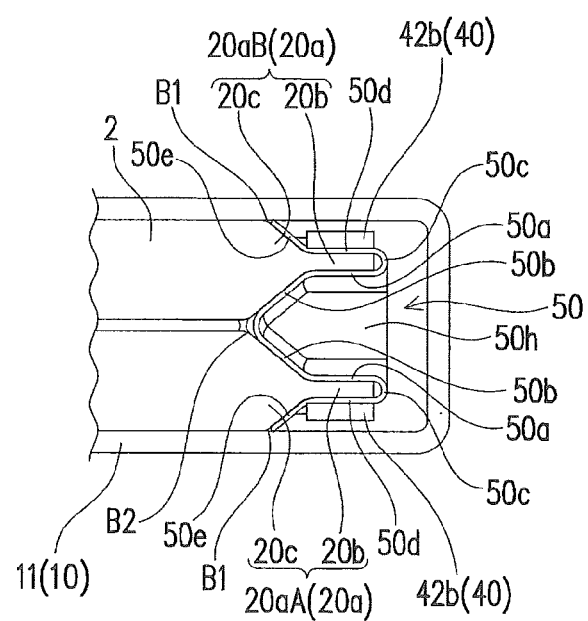
FIG. 14D shows one of various modifications.
Figure 15A:
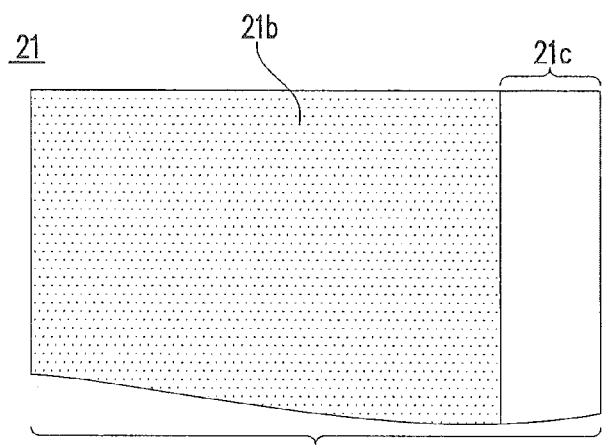
FIG. 15A shows an explanatory diagram for describing constituents of a positive electrode plate constituting a common electrode assembly.
Figure 15B:
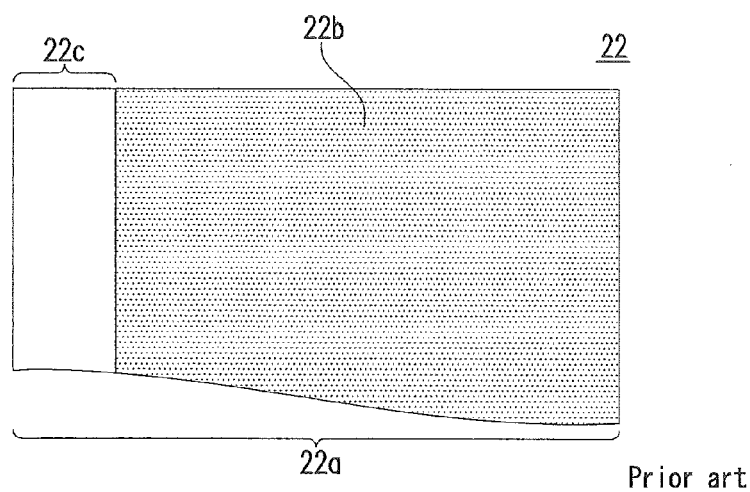
FIG. 15B shows an explanatory diagram for describing constituents of a negative electrode plate constituting the electrode assembly.
Figure 15C:
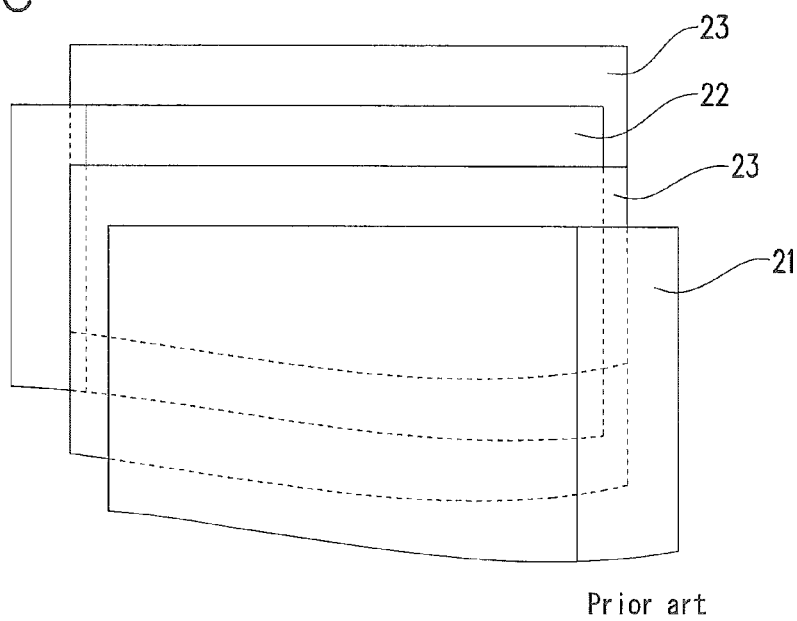
FIG. 15C shows an explanatory diagram for describing an arrangement in the width direction of a positive electrode plate, a negative electrode plate, and a separator of a common electrode assembly.
Figure 16A:
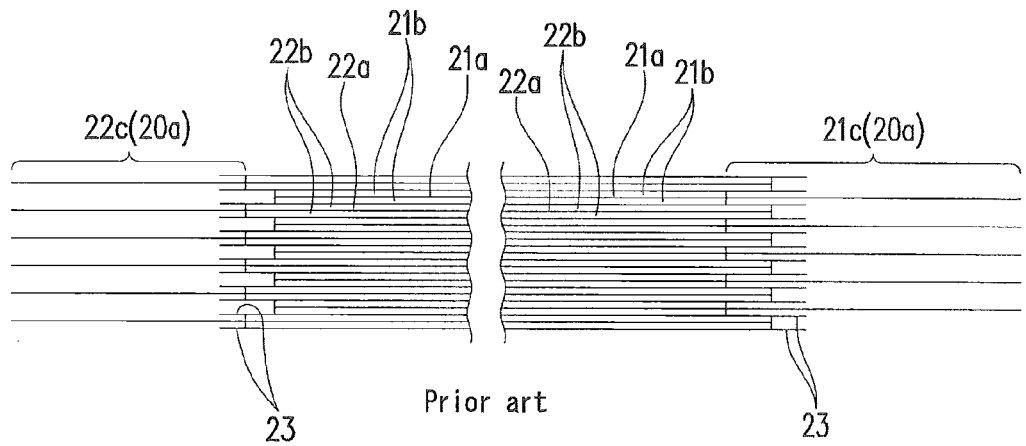
FIG. 16A shows a horizontal sectional view of the electrode assembly.
Figure 16B:
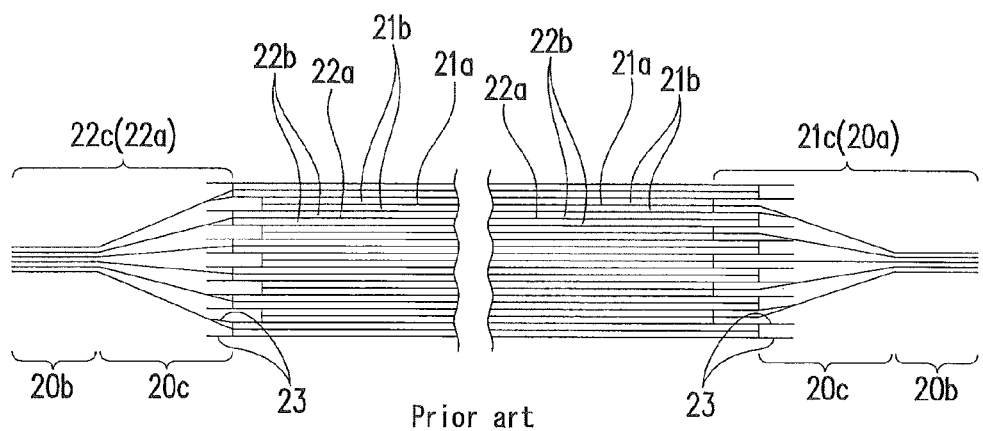
FIG. 16B shows a horizontal sectional view of the end portions of the electrode assembly when they are bound.
Figure 16C:
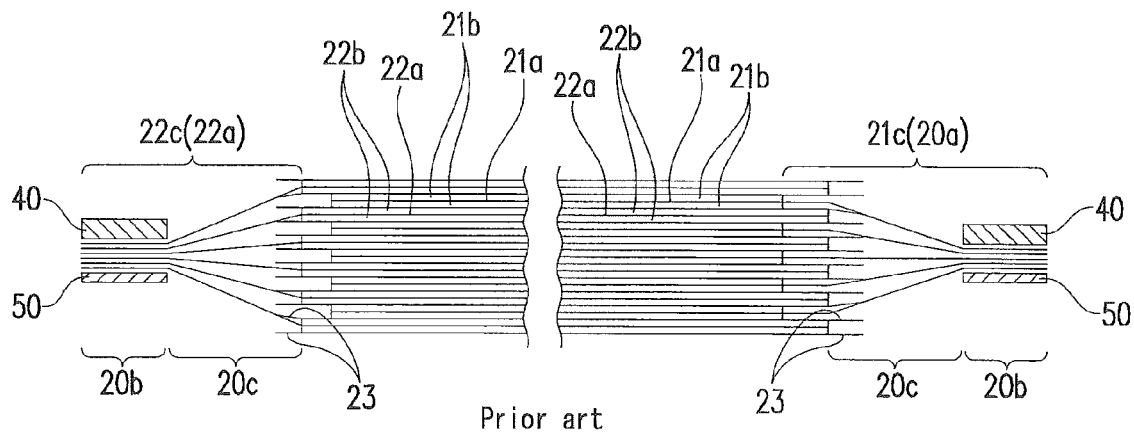
FIG. 16C shows a horizontal sectional view of the end portions of the electrode assembly to which current collectors are bonded.

Further, in the above described second embodiment, a wrapping portion around the outer surface side of the projection 20a, which is composed of the folded portion 50c, the base 50d, and the skirt 50e may be provided, as shown in FIG. 14D. In this case, the connection piece 42b of the current collector 40 is allowed to extend indirectly along the outer surface of the bound portion 20b via the base 50d.

In the above described embodiments, the backing member 50 is formed of a plate member. However, there is no limitation to this. The backing member, for example, may be in the form of a block.

In the above described first embodiment, the reinforcing pieces 50f are provided at both end portions of the backing member 50. However, there is no limitation to this. One of the reinforcing pieces 50f may be provided at only either one of the end portions. Further, it is not necessary to form the reinforcing piece 50f at the end portion of the backing member 50. As long as the strength of the skirt 50b to the base 50a can be secured, it does not matter where the reinforcing piece 50f is formed. The same applies to the reinforcing pieces 50g as to the reinforcing pieces 50f. However, it is preferable that the reinforcing pieces 50f be provided at the end portions of the backing member 50, in that not only reinforcement of the skirt 50b to the base 50a but also protection of the second sloping portions 20d, as described above, can be achieved.

In the above described second embodiment, the backing member 50 is formed into a cup shape by press-molding a plate member. However, there is no limitation to this. The backing member 50 may be formed into a cup shape, for example, by developing a plate member having a solid shape into a plane and bending or welding it.

In the above described embodiments, the connection piece 42b of the current collector 40 and the backing member 50 are bonded to each other by ultrasonic bonding. However, there is no limitation to this. Various bonding methods such as resistance welding, laser welding, and crimping, other than ultrasonic bonding can be employed. However, it is desirable to employ ultrasonic bonding when the influence of heat on the positive electrode active material layer 21b or the negative electrode active material layer 22b, sputtering, conduction resistance in the bonded portion, workability, etc., are comprehensively considered.

Further, lithium ion secondary battery cells are described in the above embodiment. However, the type and size (capacity) of battery cells are optional.

Further, the present invention is not limited to the lithium ion secondary battery cells. The present invention can be applied also to primary battery cells and capacitors such as an electric double layer capacitor in addition to various secondary battery cells.

REFERENCE SIGNS LIST

10: Case
20: Electrode Assembly

20a: Projection
20aA: First Projection
20aB: Second Projection
20b: Bound Portion
20c: Sloping Portion
20d: Second Sloping Portion
20e: Folded Portion
20f: Flat Portion
21: Positive Electrode Plate
22: Negative Electrode Plate
23: Separator
31, 32: Electrode Terminal
40: Current Collector
42b: Connection Piece
50: Backing Member
50a: First Backing Member
50b: Second Backing Member
50a, 50d: Base
50b, 50e: Skirt
50c: Folded Portion
50f: Reinforcing Piece
50g: Reinforcing Piece
50h: Coupling Piece
B1, B2: Proximal End of Projection
X: First Direction
y: Second Direction

The invention claimed is:

1. An electric storage device, comprising:
an electrode assembly formed by stacking a positive electrode plate and a negative electrode plate, the electrode assembly including a projection formed by at least one of the positive electrode plate and the negative electrode plate projecting in a stacked state, the projection including a bound portion formed by binding a distal end side of the projection and a sloping portion sloping from a proximal end side of the projection toward the bound portion;
a backing member arranged to face at least one of both surfaces of the bound portion;
a current collector including a connection piece arranged to face at least an other of both surfaces of the bound portion;
a case housing the electrode assembly, the backing member, and the current collector, the electrode assembly being supported by the current collector within the case,
wherein the backing member includes:
a base extending along a surface of the bound portion; and
a pair of skirts diverging from each other and extending from the base toward a proximal end side of the projection along a surface of the sloping portion.

2. The electric storage device according to claim 1, wherein the backing member further includes a reinforcing piece coupled to the base and the pair of skirts.

3. The electric storage device according to claim 2, wherein the bound portion is formed in a partial region of the projection in a second direction intersecting a first direction in which the projection projects,
wherein the projection includes a second sloping portion sloping toward the bound portion in the second direction, and
wherein the reinforcing piece is provided in an end portion of the backing member so as to extend along a surface of the second sloping portion.

4. The electric storage device according to claim 1, wherein the base comprises a pair of bases, each base extending along each of both surfaces of the bound portion, and
wherein each of the pair of skirts extends from each of both the bases.

5. The electric storage device according to claim 1, wherein the projection includes a first projection and a second projection that faces the first projection with a gap therebetween,
wherein the backing member includes a first backing member arranged on an outer surface of the first projection and a second backing member arranged on an outer surface of the second projection,
wherein the base of the first backing member comprises a pair of bases, the bases extending along an inner surface and an outer surface of the first projection, respectively,
wherein the first backing member comprises a first set of the pair of skirts extending from the bases of the first backing member, respectively,
wherein the base of the second backing member comprises a pair of bases, the bases extending along an inner surface and an outer surface of the second projection, respectively, and
wherein the second backing member comprises a second set of the pair of skirts extending from the bases of the second backing member, respectively.

6. The electric storage device according to claim 5, wherein a distal end of one of the first set of the pair of skirts of the first backing member that is located on the second backing member side and a distal end of one of the second set of the pair of skirts of the second backing member that is located on the first backing member side are coupled to each other.

7. The electric storage device according to claim 1, wherein the projection includes a first projection and a second projection that faces the first projection with a gap therebetween, and
wherein the backing member includes a first backing member arranged on an inner surface of the first projection and a second backing member arranged on an inner surface of the second projection.

8. The electric storage device according to claim 7, wherein a distal end of a first set of the pair of skirts of the first backing member and a distal end of a second set of the pair of skirts of the second backing member are coupled to each other.

9. The electric storage device according to claim 8, wherein the backing member further includes a coupling piece coupling side edges of the first backing member and side edges of the second backing member in a second direction intersecting a first direction in which the projection projects.

10. The electric storage device according to claim 9, wherein the coupling piece covers a lateral opening formed by the side edges of the first backing member and the side edges of the second backing member.

11. The electric storage device according to claim 1, wherein the electrode plate includes a collector substrate and an active material layer formed on a surface of the collector substrate excluding one end portion,
wherein the one end portion of the collector substrate includes an active material layer-unformed portion where the active material layer is not formed, and
wherein the projection includes the active material layer-unformed portion.

12. The electric storage device according to claim 3, wherein the electrode assembly is formed by winding the positive electrode plate and the negative electrode plate in an insulated state from each other into a flat shape, the electrode assembly including a pair of folded portions that are opposite from each other across a center axis of winding and a flat portion that is located between the pair of folded portions, wherein the projection is formed in an end portion of the electrode assembly in a direction of the center axis of winding, wherein the bound portion is formed in the flat portion in the end portion of the electrode assembly, wherein the second sloping portion is formed in the end portion of the electrode assembly, wherein the backing member is arranged on an outer surface of the end portion of the electrode assembly, and wherein the reinforcing piece extends along an outer surface of the second sloping portion.

13. The electric storage device according to claim 1, wherein the pair of skirts extends to a proximal end of the projection.

14. The electric storage device according to claim 1, wherein the projection includes a first projection and a second projection that faces the first projection with a gap therebetween, wherein the backing member includes a first backing member arranged on an outer surface of the first projection and a second backing member arranged on an outer surface of the second projection, wherein the base of the first backing member comprises a pair of bases, the bases extending along an inner surface and an outer surface of the first projection, respectively, and wherein the first backing member comprises the pair of skirts extending from the bases of the first backing member, respectively.

15. The electric storage device according to claim 1, wherein the projection includes a first projection and a second projection that faces the first projection with a gap therebetween, wherein the base comprises a pair of bases, the bases extending along an inner surface and an outer surface of the first projection, respectively, and wherein the backing member comprises the pair of skirts extending from the bases of the first backing member, respectively.

16. The electric storage device according to claim 1, wherein the backing member further includes a folded portion folded back from the base, the folded portion and the pair of skirts being located on opposing sides of the base.

17. The electric storage device according to claim 16, wherein the folded portion spaces apart a first part of the base, which extends from one of the pair of skirts, from a second part of the base, which extends from another one of the pair of skirts.

18. The electric storage device according to claim 17, wherein the surface of the bound portion is exposed between the first part of the base and the second part of the base.

19. The electric storage device according to claim 1, wherein the pair of skirts diverge from each other continuously from the base toward the proximal end side of the projection along the surface of the sloping portion.

20. An electric storage device, comprising:

an electrode assembly formed by stacking a positive electrode plate and a negative electrode plate, the electrode assembly including a projection formed by at least one of the positive electrode plate and the negative electrode plate projecting in a stacked state, the projection including a bound portion formed by binding a distal end side of the projection and a sloping portion sloping from a proximal end side of the projection toward the bound portion;

a backing member arranged to face at least one of both surfaces of the bound portion;

a current collector including a connection piece arranged to face at least an other of both surfaces of the bound portion;

a case housing the electrode assembly, the backing member, and the current collector, the electrode assembly being supported by the current collector within the case, wherein the backing member includes a base extending along a surface of the bound portion, and a skirt extending from the base toward a proximal end side of the projection along a surface of the sloping portion, wherein the projection includes a first projection and a second projection that faces the first projection with a gap therebetween, wherein the backing member includes a first backing member arranged on an outer surface of the first projection and a second backing member arranged on an outer surface of the second projection, wherein the base of the first backing member comprises a pair of bases, the bases extending along an inner surface and an outer surface of the first projection, respectively, wherein the skirt of the first backing member comprises a pair of skirts, the skirts extending from the bases of the first backing member, respectively, wherein the base of the second backing member comprises a pair of bases, the bases extending along an inner surface and an outer surface of the second projection, respectively, and wherein the skirt of the second backing member comprises a pair of skirts, the skirts extending from the bases of the second backing member, respectively.

\* \* \* \* \*